(12) United States Patent
Irving et al.

(10) Patent No.: US 10,344,833 B2
(45) Date of Patent: Jul. 9, 2019

(54) MULTI-SPEED PLANETARY TRANSMISSION

(71) Applicant: Allison Transmission, Inc., Indianapolis, IN (US)

(72) Inventors: Mitchell Irving, Danville, IN (US); Drew A. Crafton, Mooresville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 35 days.

(21) Appl. No.: 15/821,013

(22) Filed: Nov. 22, 2017

(65) Prior Publication Data

US 2018/0094707 A1 Apr. 5, 2018

Related U.S. Application Data

(62) Division of application No. 15/278,716, filed on Sep. 28, 2016, now Pat. No. 10,060,511.

(51) Int. Cl.
*F16H 3/66* (2006.01)

(52) U.S. Cl.
CPC ........ *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
USPC .......................................... 475/275
See application file for complete search history.

(56) References Cited

U.S. PATENT DOCUMENTS

| | | |
|---|---|---|
| 5,941,791 A | 8/1999 | Park |
| 6,176,803 B1 | 1/2001 | Meyer et al. |
| 6,910,985 B2 | 6/2005 | Ishimaru et al. |
| 6,955,627 B2 | 10/2005 | Thomas et al. |
| 6,984,187 B2 | 1/2006 | Biermann |
| 7,101,305 B2 | 9/2006 | Tabata et al. |
| 7,128,683 B2 | 10/2006 | Oguri et al. |

(Continued)

FOREIGN PATENT DOCUMENTS

| | | |
|---|---|---|
| DE | 102005032881 A1 | 1/2007 |
| DE | 102008015750 | 10/2008 |

(Continued)

OTHER PUBLICATIONS

U.S. Appl. No. 15/483,027, titled Multi-Speed Planetary Transmission, filed Apr. 10, 2017, claiming benefit of U.S. Appl. No. 62/400,691, filed Sep. 28, 2016, (67 pages).

(Continued)

*Primary Examiner* — Dirk Wright
(74) *Attorney, Agent, or Firm* — Faegre Baker Daniels LLP

(57) ABSTRACT

A multi-speed transmission including a plurality of planetary gearsets and a plurality of selective couplers to achieve at least nine forward speed ratios is disclosed. The plurality of planetary gearsets may include a first planetary gearset, a second planetary gearset, a third planetary gearset, and a fourth planetary gearset. The plurality of selective couplers may include a number of clutches and a number of brakes. The multi-speed transmission may have four planetary gearsets and six selective couplers. The six selective couplers may include four clutches and two brakes.

5 Claims, 12 Drawing Sheets

(56) References Cited

U.S. PATENT DOCUMENTS

| | | | |
|---|---|---|---|
| 7,226,381 B2 | 6/2007 | Klemen | |
| 7,288,044 B2 | 10/2007 | Gumpoltsberger | |
| 7,429,230 B2 | 9/2008 | Ziemer | |
| 7,549,942 B2 | 6/2009 | Gumpoltsberger | |
| 7,556,582 B2 | 7/2009 | Gumpoltsberger | |
| 7,566,283 B2 | 7/2009 | Gumpoltsberger | |
| 7,575,532 B2 | 8/2009 | Raghavan et al. | |
| 7,575,533 B2 | 8/2009 | Gumpoltsberger | |
| 7,632,206 B2 | 12/2009 | Gumpoltsberger | |
| 7,635,315 B2 * | 12/2009 | Kamm | F16H 3/666 475/278 |
| 7,651,431 B2 | 1/2010 | Phillips et al. | |
| 7,674,200 B2 | 3/2010 | Shim | |
| 7,686,730 B2 | 3/2010 | Baldwin | |
| 7,691,022 B2 | 4/2010 | Phillips et al. | |
| 7,691,024 B2 | 4/2010 | Phillips et al. | |
| 7,695,398 B2 | 4/2010 | Phillips et al. | |
| 7,704,181 B2 | 4/2010 | Phillips et al. | |
| 7,722,496 B2 | 5/2010 | Phillips et al. | |
| 7,727,104 B2 | 6/2010 | Shim | |
| 7,731,625 B2 | 6/2010 | Phillips et al. | |
| 7,736,262 B2 | 6/2010 | Suh | |
| 7,736,263 B2 | 6/2010 | Phillips et al. | |
| 7,753,820 B2 | 7/2010 | Phillips et al. | |
| 7,766,783 B2 | 8/2010 | Wittkopp et al. | |
| 7,771,305 B1 | 8/2010 | Hart et al. | |
| 7,771,306 B2 | 8/2010 | Phillips et al. | |
| 7,828,690 B2 | 11/2010 | Wittkopp et al. | |
| 7,841,960 B2 | 11/2010 | Baldwin | |
| 7,846,057 B2 | 12/2010 | Shim | |
| 7,846,058 B2 | 12/2010 | Kim | |
| 7,850,568 B2 | 12/2010 | Shim | |
| 7,850,569 B2 | 12/2010 | Seo et al. | |
| 7,867,131 B2 | 1/2011 | Hart et al. | |
| 7,887,453 B2 | 2/2011 | Phillips et al. | |
| 7,887,454 B2 | 2/2011 | Phillips et al. | |
| 7,896,774 B2 | 3/2011 | Phillips et al. | |
| 7,909,726 B2 | 3/2011 | Phillips et al. | |
| 7,909,729 B2 | 3/2011 | Tanaka et al. | |
| 7,914,414 B2 | 3/2011 | Phillips et al. | |
| 7,946,948 B2 | 5/2011 | Phillips et al. | |
| 7,959,531 B2 | 6/2011 | Phillips et al. | |
| 7,980,988 B2 | 7/2011 | Phillips et al. | |
| 7,985,159 B2 | 7/2011 | Phillips et al. | |
| 7,988,586 B2 | 8/2011 | Phillips et al. | |
| 7,993,235 B2 | 8/2011 | Wittkopp et al. | |
| 7,993,237 B2 | 8/2011 | Wittkopp et al. | |
| 7,993,238 B2 | 8/2011 | Phillips et al. | |
| 7,998,013 B2 | 8/2011 | Phillips et al. | |
| 8,002,662 B2 | 8/2011 | Phillips et al. | |
| 8,007,394 B2 | 8/2011 | Phillips et al. | |
| 8,007,395 B2 | 8/2011 | Wittkopp et al. | |
| 8,007,398 B2 | 8/2011 | Phillips et al. | |
| 8,016,713 B2 | 9/2011 | Phillips et al. | |
| 8,025,602 B2 | 9/2011 | Phillips et al. | |
| 8,033,947 B2 | 10/2011 | Phillips et al. | |
| 8,033,948 B2 | 10/2011 | Phillips et al. | |
| 8,038,565 B2 | 10/2011 | Phillips et al. | |
| 8,038,566 B2 | 10/2011 | Phillips et al. | |
| 8,043,189 B2 | 10/2011 | Phillips et al. | |
| 8,043,192 B2 | 10/2011 | Phillips et al. | |
| 8,047,950 B2 | 11/2011 | Wittkopp et al. | |
| 8,047,951 B2 | 11/2011 | Wittkopp et al. | |
| 8,047,954 B2 | 11/2011 | Phillips et al. | |
| 8,052,566 B2 | 11/2011 | Wittkopp et al. | |
| 8,052,567 B2 | 11/2011 | Hart et al. | |
| 8,057,349 B2 | 11/2011 | Phillips et al. | |
| 8,070,646 B2 | 12/2011 | Hart et al. | |
| 8,079,932 B2 | 12/2011 | Phillips et al. | |
| 8,088,032 B2 | 1/2012 | Gumpoltsberger et al. | |
| 8,096,915 B2 | 1/2012 | Wittkopp et al. | |
| 8,100,808 B2 | 1/2012 | Wittkopp et al. | |
| 8,105,198 B2 | 1/2012 | Hart et al. | |
| 8,128,527 B2 | 3/2012 | Hart et al. | |
| 8,142,324 B2 | 3/2012 | Phillips et al. | |
| 8,142,325 B2 | 3/2012 | Phillips et al. | |
| 8,152,681 B2 | 4/2012 | Seo et al. | |
| 8,157,697 B2 | 4/2012 | Hart et al. | |
| 8,167,765 B2 | 5/2012 | Phillips et al. | |
| 8,167,766 B2 | 5/2012 | Phillips et al. | |
| 8,177,675 B2 | 5/2012 | Wittkopp et al. | |
| 8,187,130 B1 | 5/2012 | Mellet et al. | |
| 8,187,137 B2 | 5/2012 | Carey et al. | |
| 8,197,375 B1 | 6/2012 | Hart et al. | |
| 8,197,376 B2 | 6/2012 | Gumpoltsberger et al. | |
| 8,202,190 B2 | 6/2012 | Phillips et al. | |
| 8,206,257 B2 | 6/2012 | Gumpoltsberger et al. | |
| 8,210,981 B2 | 7/2012 | Bauknecht et al. | |
| 8,210,982 B2 | 7/2012 | Gumpoltsberger et al. | |
| 8,210,983 B2 | 7/2012 | Gumpoltsberger et al. | |
| 8,231,495 B2 | 7/2012 | Gumpoltsberger et al. | |
| 8,231,496 B2 | 7/2012 | Gumpoltsberger et al. | |
| 8,231,501 B2 | 7/2012 | Gumpoltsberger et al. | |
| 8,241,170 B2 | 8/2012 | Gumpoltsberger et al. | |
| 8,241,171 B2 | 8/2012 | Gumpoltsberger et al. | |
| 8,246,504 B2 | 8/2012 | Gumpoltsberger et al. | |
| 8,251,856 B2 | 8/2012 | Phillips et al. | |
| 8,251,857 B1 | 8/2012 | Mellet et al. | |
| 8,251,859 B2 | 8/2012 | Gumpoltsberger et al. | |
| 8,277,355 B2 | 10/2012 | Hart et al. | |
| 8,287,420 B2 | 10/2012 | Gumpoltsberger et al. | |
| 8,303,453 B2 | 11/2012 | Wittkopp et al. | |
| 8,303,455 B2 | 11/2012 | Gumpoltsberger et al. | |
| 8,303,456 B2 | 11/2012 | Kim | |
| 8,328,678 B2 | 12/2012 | Seo et al. | |
| 8,328,679 B2 | 12/2012 | Jang et al. | |
| 8,333,676 B2 | 12/2012 | Kim | |
| 8,343,005 B2 | 1/2013 | Hart et al. | |
| 8,343,007 B2 | 1/2013 | Hart et al. | |
| 8,353,801 B2 | 1/2013 | Hart et al. | |
| 8,366,580 B2 | 2/2013 | Wittkopp et al. | |
| 8,371,982 B2 | 2/2013 | Lee et al. | |
| 8,376,893 B2 | 2/2013 | Wittkopp et al. | |
| 8,376,895 B2 | 2/2013 | Saitoh et al. | |
| 8,382,634 B2 | 2/2013 | Beck et al. | |
| 8,398,522 B2 | 3/2013 | Bauknecht et al. | |
| 8,403,803 B2 | 3/2013 | Gumpoltsberger et al. | |
| 8,409,047 B2 | 4/2013 | Borgerson et al. | |
| 8,414,445 B2 | 4/2013 | Carey et al. | |
| 8,414,446 B2 | 4/2013 | Beck et al. | |
| 8,419,587 B2 | 4/2013 | Gumpoltsberger et al. | |
| 8,425,367 B2 | 4/2013 | Phillips et al. | |
| 8,425,368 B2 | 4/2013 | Phillips et al. | |
| 8,425,369 B2 | 4/2013 | Wittkopp et al. | |
| 8,425,370 B2 | 4/2013 | Leesch et al. | |
| 8,430,784 B2 | 4/2013 | Hart et al. | |
| 8,430,785 B2 | 4/2013 | Beck et al. | |
| 8,435,151 B2 | 5/2013 | Seo et al. | |
| 8,435,153 B2 | 5/2013 | Phillips et al. | |
| 8,444,524 B2 | 5/2013 | Gumpoltsberger et al. | |
| 8,444,525 B2 | 5/2013 | Gumpoltsberger et al. | |
| 8,460,151 B2 | 6/2013 | Wittkopp et al. | |
| 8,465,390 B2 | 6/2013 | Brehmer et al. | |
| 8,480,533 B2 | 7/2013 | Meyer et al. | |
| 8,485,934 B2 | 7/2013 | Gumpoltsberger et al. | |
| 8,496,556 B2 | 7/2013 | Wittkopp et al. | |
| 8,496,558 B2 | 7/2013 | Wittkopp et al. | |
| 8,506,442 B2 | 8/2013 | Mellet et al. | |
| 8,506,443 B2 | 8/2013 | Seo et al. | |
| 8,512,196 B2 | 8/2013 | Mellet et al. | |
| 8,523,729 B2 | 9/2013 | Hart et al. | |
| 8,529,394 B2 | 9/2013 | Gumpoltsberger et al. | |
| 8,529,395 B2 | 9/2013 | Wittkopp et al. | |
| 8,529,396 B1 | 9/2013 | Vernon et al. | |
| 8,545,362 B1 | 10/2013 | Goleski et al. | |
| 8,556,766 B2 | 10/2013 | Mellet et al. | |
| 8,556,768 B2 | 10/2013 | Park et al. | |
| 8,574,113 B1 | 11/2013 | Goleski | |
| 8,574,114 B2 | 11/2013 | Brehmer et al. | |
| 8,581,753 B2 | 11/2013 | Kim et al. | |
| 8,591,364 B2 | 11/2013 | Hart | |
| 8,591,376 B1 | 11/2013 | Shim et al. | |
| 8,591,377 B1 | 11/2013 | Hoffman et al. | |
| 8,596,442 B2 | 12/2013 | Watanabe et al. | |

(56) References Cited

U.S. PATENT DOCUMENTS

| | | |
|---|---|---|
| 8,597,152 B2 | 12/2013 | Seo et al. |
| 8,597,153 B2 | 12/2013 | Saitoh et al. |
| 8,602,934 B2 | 12/2013 | Mellet et al. |
| 8,608,612 B2 | 12/2013 | Park et al. |
| 8,617,021 B1 | 12/2013 | Goleski et al. |
| 8,617,022 B1 | 12/2013 | Vernon et al. |
| 8,636,617 B2 | 1/2014 | Singh |
| 8,636,618 B2 | 1/2014 | Hart et al. |
| 8,647,227 B2 | 2/2014 | Park et al. |
| 8,651,994 B2 | 2/2014 | Bassi et al. |
| 8,657,717 B2 | 2/2014 | Gumpoltsberger et al. |
| 8,663,053 B2 | 3/2014 | Beck et al. |
| 8,663,055 B2 | 3/2014 | Brehmer et al. |
| 8,663,056 B2 | 3/2014 | Gumpoltsberger et al. |
| 8,678,972 B2 | 3/2014 | Wittkopp et al. |
| 8,690,722 B2 | 4/2014 | Phillips et al. |
| 8,702,544 B2 | 4/2014 | Tamai et al. |
| 8,702,554 B2 | 4/2014 | Gumpoltsberger et al. |
| 8,702,555 B1 | 4/2014 | Hart et al. |
| 8,708,862 B2 | 4/2014 | Scherer et al. |
| 8,721,488 B2 | 5/2014 | Mellet et al. |
| 8,721,492 B2 | 5/2014 | Fellmann et al. |
| 8,727,929 B2 | 5/2014 | Beck et al. |
| 8,734,285 B2 | 5/2014 | Wilton et al. |
| 8,734,286 B2 | 5/2014 | Coffey et al. |
| 8,758,187 B2 | 6/2014 | Mellet et al. |
| 8,758,189 B2 | 6/2014 | Hart et al. |
| 8,777,797 B2 | 7/2014 | Mellet et al. |
| 8,777,798 B2 | 7/2014 | Borgerson et al. |
| 8,801,563 B2 | 8/2014 | Ohnemus et al. |
| 8,801,565 B2 | 8/2014 | Hart et al. |
| 8,808,134 B2 | 8/2014 | Saitoh et al. |
| 8,808,135 B2 | 8/2014 | Vahabzadeh et al. |
| 8,821,336 B2 | 9/2014 | Wilton et al. |
| 8,845,476 B2 | 9/2014 | Coffey |
| 8,858,386 B2 | 10/2014 | Wittkopp et al. |
| 8,858,387 B2 | 10/2014 | Haupt et al. |
| 8,864,618 B1 | 10/2014 | Noh et al. |
| 8,888,648 B2 | 11/2014 | Mellet et al. |
| 8,894,535 B2 | 11/2014 | Mellet et al. |
| 8,894,536 B2 | 11/2014 | Beck et al. |
| 8,915,819 B2 | 12/2014 | Coffey et al. |
| 8,920,281 B2 | 12/2014 | Mellet et al. |
| 8,932,174 B2 | 1/2015 | Hart et al. |
| 8,939,863 B2 | 1/2015 | Hart et al. |
| 8,944,949 B2 | 2/2015 | Mellet et al. |
| 8,951,160 B2 | 2/2015 | Vernon et al. |
| 8,961,355 B2 | 2/2015 | Hart et al. |
| 8,961,356 B2 | 2/2015 | Bockenstette et al. |
| 8,968,142 B2 | 3/2015 | Lippert |
| 8,968,144 B2 | 3/2015 | Janson et al. |
| 8,968,145 B2 | 3/2015 | Mellet et al. |
| 8,979,701 B2 | 3/2015 | Baldwin |
| 8,986,153 B2 | 3/2015 | Park et al. |
| 8,992,373 B2 | 3/2015 | Beck et al. |
| 8,992,374 B2 | 3/2015 | Shibamura et al. |
| 9,011,287 B2 | 4/2015 | Meyer et al. |
| 9,039,562 B2* | 5/2015 | Beck ............... F16H 3/66 475/275 |
| 9,050,882 B2 | 6/2015 | Mellet et al. |
| 9,091,330 B2 | 7/2015 | Singh |
| 9,133,913 B2 | 9/2015 | Mellet et al. |
| 9,140,336 B2 | 9/2015 | Goleski |
| 9,175,747 B2 | 11/2015 | Lippert et al. |
| 9,175,748 B2 | 11/2015 | Goleski et al. |
| 9,194,464 B2* | 11/2015 | Beck ............... F16H 3/66 |
| 9,222,549 B2 | 12/2015 | Mellet et al. |
| 9,322,460 B1 | 4/2016 | Ji et al. |
| 9,366,319 B2 | 6/2016 | Lippert |
| 9,423,006 B2 | 8/2016 | Beck et al. |
| 9,429,215 B2 | 8/2016 | Noh et al. |
| 9,435,405 B2 | 9/2016 | Etchason |
| 9,488,269 B2 | 11/2016 | Yoshida et al. |
| 9,528,573 B2 | 12/2016 | Baldwin |
| 9,568,069 B2 | 2/2017 | Beck et al. |
| 9,587,716 B1 | 3/2017 | Park et al. |
| 9,599,195 B2 | 3/2017 | Beck et al. |
| 9,618,090 B2 | 4/2017 | Cho et al. |
| 9,670,992 B2* | 6/2017 | Cho ............... F16H 3/66 |
| 9,726,256 B2 | 8/2017 | Muller et al. |
| 9,759,291 B2 | 9/2017 | Beck et al. |
| 9,777,802 B2 | 10/2017 | Lippert et al. |
| 9,784,344 B1 | 10/2017 | Cho et al. |
| 9,822,857 B2 | 11/2017 | Park et al. |
| 9,927,009 B2 | 3/2018 | Foster et al. |
| 9,933,047 B1* | 4/2018 | Cho ............... F16H 3/66 |
| 2004/0048716 A1 | 3/2004 | Ziemer |
| 2006/0205556 A1 | 9/2006 | Klemen |
| 2006/0223666 A1 | 10/2006 | Gumpoltsberger |
| 2007/0207891 A1 | 9/2007 | Gumpoltsberger |
| 2007/0213168 A1 | 9/2007 | Gumpoltsberger |
| 2008/0070740 A1 | 3/2008 | Gumpoltsberger |
| 2008/0125269 A1 | 5/2008 | Gumpoltsberger |
| 2008/0300092 A1 | 12/2008 | Phillips et al. |
| 2009/0011891 A1 | 1/2009 | Phillips et al. |
| 2009/0017964 A1 | 1/2009 | Phillips et al. |
| 2009/0017965 A1 | 1/2009 | Phillips et al. |
| 2009/0017966 A1 | 1/2009 | Phillips et al. |
| 2009/0017971 A1 | 1/2009 | Phillips et al. |
| 2009/0017976 A1 | 1/2009 | Phillips et al. |
| 2009/0017977 A1 | 1/2009 | Phillips et al. |
| 2009/0017979 A1 | 1/2009 | Phillips et al. |
| 2009/0017980 A1 | 1/2009 | Phillips et al. |
| 2009/0036253 A1 | 2/2009 | Phillips et al. |
| 2009/0048059 A1 | 2/2009 | Phillips et al. |
| 2009/0048062 A1 | 2/2009 | Seo et al. |
| 2009/0054196 A1 | 2/2009 | Phillips et al. |
| 2009/0118057 A1 | 5/2009 | Wittkopp et al. |
| 2009/0118059 A1 | 5/2009 | Phillips et al. |
| 2009/0118062 A1 | 5/2009 | Phillips et al. |
| 2009/0124448 A1 | 5/2009 | Wittkopp et al. |
| 2009/0192009 A1 | 7/2009 | Phillips et al. |
| 2009/0192010 A1 | 7/2009 | Wittkopp et al. |
| 2009/0192011 A1 | 7/2009 | Wittkopp et al. |
| 2009/0192012 A1 | 7/2009 | Phillips et al. |
| 2009/0197733 A1 | 8/2009 | Phillips et al. |
| 2009/0197734 A1 | 8/2009 | Phillips et al. |
| 2009/0209387 A1 | 8/2009 | Phillips et al. |
| 2009/0209389 A1 | 8/2009 | Phillips et al. |
| 2009/0215580 A1 | 8/2009 | Hart et al. |
| 2009/0280947 A1 | 11/2009 | Seo et al. |
| 2010/0041508 A1 | 2/2010 | Gumpoltsberger et al. |
| 2010/0041509 A1 | 2/2010 | Gumpoltsberger et al. |
| 2010/0069195 A1 | 3/2010 | Baldwin |
| 2010/0190600 A1 | 7/2010 | Phillips et al. |
| 2010/0210392 A1 | 8/2010 | Hart et al. |
| 2010/0210393 A1 | 8/2010 | Phillips et al. |
| 2010/0210394 A1 | 8/2010 | Phillips et al. |
| 2010/0210395 A1 | 8/2010 | Phillips et al. |
| 2010/0210396 A1 | 8/2010 | Wittkopp et al. |
| 2010/0210397 A1 | 8/2010 | Wittkopp et al. |
| 2010/0210398 A1 | 8/2010 | Hart et al. |
| 2010/0210400 A1 | 8/2010 | Phillips et al. |
| 2010/0210401 A1 | 8/2010 | Phillips et al. |
| 2010/0210402 A1 | 8/2010 | Phillips et al. |
| 2010/0210403 A1 | 8/2010 | Wittkopp et al. |
| 2010/0210404 A1 | 8/2010 | Phillips et al. |
| 2010/0210405 A1 | 8/2010 | Phillips et al. |
| 2010/0210406 A1 | 8/2010 | Phillips et al. |
| 2010/0216589 A1 | 8/2010 | Hart et al. |
| 2010/0216590 A1 | 8/2010 | Phillips et al. |
| 2010/0216591 A1 | 8/2010 | Wittkopp et al. |
| 2010/0227729 A1 | 9/2010 | Wittkopp et al. |
| 2010/0279814 A1 | 11/2010 | Brehmer et al. |
| 2010/0331136 A1 | 12/2010 | Jang et al. |
| 2011/0009229 A1 | 1/2011 | Bauknecht et al. |
| 2011/0045936 A1 | 2/2011 | Gumpoltsberger et al. |
| 2011/0045937 A1 | 2/2011 | Gumpoltsberger et al. |
| 2011/0045938 A1 | 2/2011 | Gumpoltsberger et al. |
| 2011/0045939 A1 | 2/2011 | Gumpoltsberger et al. |
| 2011/0045940 A1 | 2/2011 | Gumpoltsberger et al. |
| 2011/0045942 A1 | 2/2011 | Gumpoltsberger et al. |
| 2011/0045943 A1 | 2/2011 | Gumpoltsberger et al. |
| 2011/0124462 A1 | 5/2011 | Meyer et al. |

(56) References Cited

U.S. PATENT DOCUMENTS

| | | |
|---|---|---|
| 2011/0136615 A1 | 6/2011 | Phillips et al. |
| 2011/0183807 A1 | 7/2011 | Gumpoltsberger et al. |
| 2011/0212806 A1 | 9/2011 | Phillips et al. |
| 2011/0245013 A1 | 10/2011 | Kim |
| 2011/0245026 A1 | 10/2011 | Phillips et al. |
| 2011/0251014 A1 | 10/2011 | Leesch et al. |
| 2011/0275472 A1 | 11/2011 | Phillips et al. |
| 2011/0294617 A1 | 12/2011 | Seo et al. |
| 2012/0004066 A1 | 1/2012 | Seo et al. |
| 2012/0053004 A1 | 3/2012 | Beck et al. |
| 2012/0053005 A1 | 3/2012 | Beck et al. |
| 2012/0053008 A1 | 3/2012 | Beck et al. |
| 2012/0058856 A1 | 3/2012 | Phillips et al. |
| 2012/0065019 A1 | 3/2012 | Hart et al. |
| 2012/0108382 A1 | 5/2012 | Saitoh et al. |
| 2012/0108383 A1 | 5/2012 | Saitoh et al. |
| 2012/0115671 A1 | 5/2012 | Gumpoltsberger et al. |
| 2012/0115672 A1 | 5/2012 | Gumpoltsberger et al. |
| 2012/0122626 A1 | 5/2012 | Gumpoltsberger et al. |
| 2012/0122627 A1 | 5/2012 | Gumpoltsberger et al. |
| 2012/0135834 A1 | 5/2012 | Gumpoltsberger et al. |
| 2012/0135835 A1 | 5/2012 | Gumpoltsberger et al. |
| 2012/0149525 A1 | 6/2012 | Gumpoltsberger et al. |
| 2012/0149526 A1 | 6/2012 | Gumpoltsberger et al. |
| 2012/0149527 A1 | 6/2012 | Gumpoltsberger et al. |
| 2012/0172172 A1 | 7/2012 | Gumpoltsberger et al. |
| 2012/0178564 A1 | 7/2012 | Vahabzadeh et al. |
| 2012/0178572 A1 | 7/2012 | Hart |
| 2012/0178579 A1 | 7/2012 | Hart et al. |
| 2012/0178580 A1 | 7/2012 | Wittkopp et al. |
| 2012/0178581 A1 | 7/2012 | Wittkopp et al. |
| 2012/0178582 A1 | 7/2012 | Wittkopp et al. |
| 2012/0196718 A1 | 8/2012 | Hart et al. |
| 2012/0214632 A1 | 8/2012 | Mellet et al. |
| 2012/0214633 A1 | 8/2012 | Mellet et al. |
| 2012/0214636 A1 | 8/2012 | Hart et al. |
| 2012/0214637 A1 | 8/2012 | Hart et al. |
| 2012/0214638 A1 | 8/2012 | Hart et al. |
| 2012/0231917 A1 | 9/2012 | Phillips et al. |
| 2012/0231920 A1 | 9/2012 | Wittkopp et al. |
| 2012/0295754 A1 | 11/2012 | Hart et al. |
| 2012/0329600 A1 | 12/2012 | Park et al. |
| 2013/0029799 A1 | 1/2013 | Park et al. |
| 2013/0040776 A1 | 2/2013 | Mellet et al. |
| 2013/0085031 A1 | 4/2013 | Bassi et al. |
| 2013/0085033 A1 | 4/2013 | Wittkopp et al. |
| 2013/0150203 A1 | 6/2013 | Park et al. |
| 2013/0150204 A1 | 6/2013 | Park et al. |
| 2013/0187796 A1 | 7/2013 | Kim et al. |
| 2013/0203549 A1 | 8/2013 | Mellet et al. |
| 2013/0237365 A1 | 9/2013 | Coffey et al. |
| 2013/0252780 A1 | 9/2013 | Ohnemus et al. |
| 2013/0310211 A1 | 11/2013 | Wilton et al. |
| 2015/0094185 A1 | 4/2015 | Beck et al. |
| 2015/0133258 A1 | 5/2015 | Beck et al. |
| 2015/0267782 A1 | 9/2015 | Beck et al. |
| 2016/0040754 A1 | 2/2016 | Schoolcraft |
| 2016/0047440 A1 | 2/2016 | Long et al. |
| 2016/0053865 A1 | 2/2016 | Beck et al. |
| 2016/0053868 A1 | 2/2016 | Beck et al. |
| 2016/0053869 A1 | 2/2016 | Beck et al. |
| 2016/0061298 A1 | 3/2016 | Beck et al. |
| 2016/0084356 A1 | 3/2016 | Beck et al. |
| 2016/0108997 A1 | 4/2016 | Ogauchi et al. |
| 2016/0116025 A1 | 4/2016 | Muller et al. |
| 2016/0116026 A1 | 4/2016 | Muller et al. |
| 2016/0116027 A1 | 4/2016 | Muller et al. |
| 2016/0116028 A1 | 4/2016 | Muller et al. |
| 2016/0116029 A1 | 4/2016 | Muller et al. |
| 2016/0138680 A1 | 5/2016 | Schoolcraft |
| 2016/0138681 A1 | 5/2016 | Schoolcraft |
| 2016/0138682 A1 | 5/2016 | Schoolcraft |
| 2016/0333971 A1 | 11/2016 | Cho et al. |
| 2016/0341289 A1 | 11/2016 | Kato et al. |
| 2016/0356342 A1 | 12/2016 | Hwang et al. |
| 2016/0363192 A1 | 12/2016 | Lee et al. |
| 2017/0074373 A1 | 3/2017 | Park et al. |
| 2017/0108091 A1 | 4/2017 | Cho et al. |
| 2017/0159758 A1 | 6/2017 | Kook et al. |
| 2017/0268612 A1 | 9/2017 | Cho et al. |
| 2018/0003269 A1 | 1/2018 | Kook et al. |
| 2018/0087612 A1 | 3/2018 | Irving et al. |

FOREIGN PATENT DOCUMENTS

| | | |
|---|---|---|
| DE | 102008019356 | 11/2008 |
| DE | 102008026831 | 1/2009 |
| DE | 102009028686 | 2/2011 |
| DE | 102010063501 A1 | 6/2012 |
| DE | 102014217052 | 3/2016 |

OTHER PUBLICATIONS

U.S. Appl. No. 15/278,183, titled Multi-Speed Planetary Transmission, filed Sep. 28, 2016, (29 pages).

U.S. Appl. No. 15/278,951, titled Multi-Speed Planetary Transmission, filed Sep. 28, 2016, (54 pages).

U.S. Appl. No. 15/471,546, titled Multi-Speed Planetary Transmission, filed Mar. 28, 2017, claiming benefit of U.S. Appl. No. 62/400,943, filed Sep. 28, 2016, (27 pages).

U.S. Appl. No. 15/278,881, titled Multi-Speed Planetary Transmission, filed Sep. 28, 2016, (39 pages).

U.S. Appl. No. 15/483,014, titled Multi-Speed Planetary Transmission, filed Apr. 10, 2017, claiming benefit of U.S. Appl. No. 62/400,932, filed Sep. 28, 2016, (31 pages).

U.S. Appl. No. 15/278,834, titled Multi-Speed Planetary Transmission, filed Sep. 28, 2016, (29 pages).

U.S. Appl. No. 15/471,571, titled Multi-Speed Planetary Transmission, filed Mar. 28, 2017, claiming benefit of U.S. Appl. No. 62/400,914, filed Sep. 28, 2016, (31 pages).

U.S. Appl. No. 15/477,165 titled Multi-Speed Planetary Transmission, filed Apr. 3, 2017, claiming benefit of U.S. Appl. No. 62/400,901, filed Sep. 28, 2016, (29 pages).

U.S. Appl. No. 15/278,745 titled Multi-Speed Planetary Transmission, filed Sep. 28, 2016, (28 pages).

U.S. Appl. No. 15/278,694, titled Multi-Speed Planetary Transmission, filed Sep. 28, 2016, (60 pages).

U.S. Appl. No. 15/278,674, titled Multi-Speed Planetary Transmission, filed Sep. 28, 2016, (44 pages).

U.S. Appl. No. 15/483,005, titled Multi-Speed Planetary Transmission, filed Apr. 10, 2017, claiming benefit of U.S. Appl. No. 62/400,832, filed Sep. 28, 2016, (40 pages).

U.S. Appl. No. 15/278,586, titled Multi-Speed Planetary Transmission, filed Sep. 28, 2016, (43 pages).

U.S. Appl. No. 15/482,992 titled Multi-Speed Planetary Transmission, filed Apr. 10, 2017, claiming benefit of U.S. Appl. No. 62/400,818, filed Sep. 28, 2016, (41 pages).

U.S. Appl. No. 15/278,500, titled Multi-Speed Planetary Transmission, filed Sep. 28, 2016, (32 pages).

U.S. Appl. No. 15/278,388, titled Multi-Speed Planetary Transmission, filed Sep. 28, 2016, (41 pages).

U.S. Appl. No. 15/471,589 titled Multi-Speed Planetary Transmission, filed Mar. 28, 2017, claiming benefit of U.S. Appl. No. 62/400,764, filed Sep. 28, 2016, (42 pages).

U.S. Appl. No. 15/278,343, titled Multi-Speed Planetary Transmission, filed Sep. 28, 2016, (60 pages).

U.S. Appl. No. 15/278,311, titled Multi-Speed Planetary Transmission, filed Sep. 28, 2016, (33 pages).

U.S. Appl. No. 15/278,288, titled Multi-Speed Planetary Transmission, filed Sep. 28, 2016, (60 pages).

Thomas Belz: "Vananten von Mehrgang-Planetengetneben", Mar. 8, 2016 (Mar. 8, 2016), XP055257458, Retrieved from the Internet: URL:https://register.epo.org/application?documentid= EYPWMGE67270DSU&appnumber=EP13756488&showPdfPage= all [retrieved on Mar. 11, 2016], 42 pages.

(56) References Cited

OTHER PUBLICATIONS

European search report and European search opinion dated Mar 23, 2018 for EP Application No. 17191789.

* cited by examiner

|  |  |  | CLUTCH APPLY TABLE | | | | | |
|---|---|---|---|---|---|---|---|---|
| RANGE | RATIO | STEP | 162 | 164 | 166 | 168 | 170 | 172 |
| REV | -4.05 |  |  |  | 1 |  | 1 | 1 |
| 1 | 4.50 | -0.90 |  | 1 |  |  | 1 | 1 |
| 2 | 3.10 | 1.45 | 1 |  |  |  | 1 | 1 |
| 3 | 2.34 | 1.33 |  |  |  | 1 | 1 | 1 |
| 4 | 1.66 | 1.41 |  | 1 |  | 1 | 1 |  |
| 5 | 1.30 | 1.28 |  | 1 |  | 1 |  | 1 |
| 6 | 1.15 | 1.13 | 1 | 1 |  | 1 |  |  |
| 7 | 1.00 | 1.15 |  | 1 | 1 | 1 |  |  |
| 8 | 0.77 | 1.30 | 1 | 1 | 1 |  |  |  |
| 9 | 0.66 | 1.17 |  | 1 | 1 |  |  | 1 |
| 10 | 0.52 | 1.25 | 1 |  | 1 |  |  | 1 |

"1" = ENGAGED CONFIGURATION
"BLANK" = DISENGAGED CONFIGURATION

FIG. 2

| RANGE | RATIO | STEP | CLUTCH APPLY TABLE ||||||
|---|---|---|---|---|---|---|---|---|
| | | | 362 | 364 | 366 | 368 | 370 | 372 |
| REV | -3.18 | | | 1 | | 1 | 1 | |
| 1 | 5.22 | -0.61 | | 1 | | | 1 | 1 |
| 2 | 3.26 | 1.60 | | | | 1 | 1 | 1 |
| 3 | 2.39 | 1.37 | 1 | | | | 1 | 1 |
| 4 | 1.77 | 1.35 | | | 1 | | 1 | 1 |
| 5 | 1.45 | 1.22 | 1 | | 1 | | | 1 |
| 6 | 1.13 | 1.28 | | 1 | 1 | | | 1 |
| 7 | 1.00 | 1.13 | | | 1 | 1 | | 1 |
| 8 | 0.84 | 1.19 | | 1 | 1 | 1 | | |
| 9 | 0.66 | 1.26 | 1 | | 1 | 1 | | |
| 10 | 0.58 | 1.14 | | | 1 | 1 | 1 | |

"1" = ENGAGED CONFIGURATION
"BLANK" = DISENGAGED CONFIGURATION

FIG. 4

| RANGE | RATIO | STEP | CLUTCH APPLY TABLE ||||||
|---|---|---|---|---|---|---|---|---|
| | | | 562 | 564 | 566 | 568 | 570 | 572 |
| REV | -3.98 | | | | 1 | 1 | | 1 |
| 1 | 4.39 | -0.91 | 1 | | | 1 | | 1 |
| 2 | 3.13 | 1.40 | | 1 | | 1 | | 1 |
| 3 | 2.25 | 1.39 | | 1 | | 1 | 1 | |
| 4 | 1.78 | 1.26 | 1 | | | 1 | 1 | |
| 5 | 1.36 | 1.31 | 1 | | | | 1 | 1 |
| 6 | 1.17 | 1.16 | 1 | 1 | | | 1 | |
| 7 | 1.00 | 1.17 | | 1 | 1 | | 1 | |
| 8 | 0.79 | 1.27 | 1 | 1 | 1 | | | |
| 9 | 0.67 | 1.18 | 1 | | 1 | | | 1 |
| 10 | 0.55 | 1.22 | | 1 | 1 | | | 1 |

"1" = ENGAGED CONFIGURATION
"BLANK" = DISENGAGED CONFIGURATION

FIG. 6

| | | | CLUTCH APPLY TABLE | | | | | |
|---|---|---|---|---|---|---|---|---|
| RANGE | RATIO | STEP | 762 | 764 | 766 | 768 | 770 | 772 |
| REV | -2.94 |  |  | 1 |  |  | 1 | 1 |
| 1 | 4.89 | -0.60 |  | 1 |  | 1 |  | 1 |
| 2 | 3.24 | 1.51 |  |  |  | 1 | 1 | 1 |
| 3 | 2.44 | 1.33 | 1 |  |  | 1 |  | 1 |
| 4 | 1.85 | 1.32 |  |  | 1 | 1 |  | 1 |
| 5 | 1.49 | 1.24 | 1 |  |  | 1 | 1 |  |
| 6 | 1.14 | 1.30 |  | 1 | 1 | 1 |  |  |
| 7 | 1.00 | 1.14 |  |  | 1 | 1 | 1 |  |
| 8 | 0.83 | 1.21 |  | 1 | 1 |  | 1 |  |
| 9 | 0.65 | 1.28 | 1 |  | 1 |  | 1 |  |
| 10 | 0.57 | 1.14 |  |  | 1 |  | 1 | 1 |

"1" = ENGAGED CONFIGURATION
"BLANK" = DISENGAGED CONFIGURATION

FIG. 8

| RANGE | RATIO | STEP | CLUTCH APPLY TABLE | | | | | |
|---|---|---|---|---|---|---|---|---|
| | | | 962 | 964 | 966 | 968 | 970 | 972 |
| REV | -4.76 | | | 1 | | 1 | 1 | |
| 1 | 5.26 | -0.90 | | 1 | | | 1 | 1 |
| 2 | 3.60 | 1.46 | | | | 1 | 1 | 1 |
| 3 | 2.59 | 1.39 | 1 | | | | 1 | 1 |
| 4 | 1.98 | 1.31 | | | 1 | | 1 | 1 |
| 5 | 1.61 | 1.23 | 1 | | | 1 | | 1 |
| 6 | 1.23 | 1.31 | | | 1 | 1 | | 1 |
| 7 | 1.00 | 1.23 | | | | 1 | 1 | 1 |
| 8 | 0.83 | 1.21 | | 1 | 1 | 1 | | |
| 9 | 0.70 | 1.17 | 1 | | | 1 | 1 | |
| 10 | 0.65 | 1.09 | | | | 1 | 1 | 1 |

"1" = ENGAGED CONFIGURATION
"BLANK" = DISENGAGED CONFIGURATION

FIG. 10

| | | | CLUTCH APPLY TABLE | | | | | |
|---|---|---|---|---|---|---|---|---|
| RANGE | RATIO | STEP | 1162 | 1164 | 1166 | 1168 | 1170 | 1172 |
| REV | -4.04 | | | 1 | | 1 | | 1 |
| 1 | 5.00 | -0.81 | | 1 | | | 1 | 1 |
| 2 | 3.22 | 1.56 | | | | 1 | 1 | 1 |
| 3 | 2.26 | 1.42 | 1 | | | | 1 | 1 |
| 4 | 1.80 | 1.26 | | | 1 | | 1 | 1 |
| 5 | 1.54 | 1.17 | 1 | 1 | | | 1 | |
| 6 | 1.18 | 1.31 | | 1 | 1 | | 1 | |
| 7 | 1.00 | 1.18 | | | 1 | 1 | 1 | |
| 8 | 0.84 | 1.18 | | 1 | 1 | 1 | | |
| 9 | 0.70 | 1.21 | 1 | | 1 | 1 | | |
| 10 | 0.65 | 1.08 | | | 1 | 1 | | 1 |

"1" = ENGAGED CONFIGURATION
"BLANK" = DISENGAGED CONFIGURATION

MULTI-SPEED PLANETARY TRANSMISSION

RELATED APPLICATION

This application is a divisional application of U.S. patent Ser. No. 15/278,716, filed Sep. 28, 2016, titled MULTI-SPEED PLANETARY TRANSMISSION, the entire disclosure of which is expressly incorporated by reference herein.

FIELD OF THE DISCLOSURE

The present disclosure relates to a multi-speed transmission and in particular to a multi-speed transmission including a plurality of planetary gearsets and a plurality of selective couplers to achieve at least nine forward speed ratios and at least one reverse speed ratio.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in US Published Patent Application No. 2016/0047440, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets and a plurality of selective couplers to achieve at least nine forward speed ratios. The plurality of planetary gearsets may include a first planetary gearset, a second planetary gearset, a third planetary gearset, and a fourth planetary gearset. The plurality of selective couplers may include a number of clutches and a number of brakes. In one example, the present disclosure provides a multi-speed transmission having four planetary gearsets and six selective couplers. The six selective couplers may include four clutches and two brakes. In one example a gearset component of one of the plurality of planetary gearsets is grounded to at least one stationary member.

In some instances throughout this disclosure and in the claims, numeric terminology, such as first, second, third, and fourth, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, and the fourth planetary gearset, depending on the language of the claims.

According to an exemplary embodiment of the present disclosure, a transmission is provided. The transmission comprising at least one stationary member; an input member; a plurality of planetary gearsets operatively coupled to the input member; a plurality of selective couplers operatively coupled to the plurality of planetary gearsets, each of the plurality of selective couplers having an engaged configuration and a disengaged configuration; and an output member operatively coupled to the input member through the plurality of planetary gearsets. Each planetary gearset of the plurality of planetary gearsets includes a sun gear, a plurality of planet gears operatively coupled to the sun gear, a planet carrier operatively coupled to the plurality of planet gears, and a ring gear operatively coupled to the plurality of planet gears. The plurality of planetary gearsets includes a first planetary gearset, a second planetary gearset, a third planetary gearset, and a fourth planetary gearset. Each of the first planetary gearset, the second planetary gearset, the third planetary gearset, and the fourth planetary gearset is a simple planetary gearset. The input member is fixedly coupled to the ring gear of the first planetary gearset. At least one of the sun gear, the planet carrier, and the ring gear of one of the second planetary gearset, the third planetary gearset, and the fourth planetary gearset is fixedly coupled to the at least one stationary member.

According to another exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The third gearset component of the third planetary gearset is fixedly coupled to the at least one stationary member. The output member is fixedly coupled to the third gearset component of the fourth planetary gearset. The transmission further comprising a first interconnector which fixedly couples the first gearset component of the first planetary gearset, the first gearset component of the second planetary gearset, and the first gearset component of the fourth planetary gearset together; a second interconnector which fixedly couples the second gearset component of the third planetary gearset to the second gearset component of the fourth planetary gearset; and a plurality of selective couplers. The plurality of selective couplers includes a first selective coupler which, when engaged, fixedly couples the third gearset component of the second planetary gearset to the at least one stationary member; a second selective coupler which, when engaged, fixedly couples the second gearset component of the second planetary gearset to the at least one stationary member; a third selective coupler which, when engaged, fixedly couples the third gearset component of the first planetary gearset to the second gearset component of the third planetary gearset and the second gearset component of the fourth planetary gearset; a fourth selective coupler which, when engaged, fixedly couples the second gearset component of the first planetary gearset to the second gearset component of the third planetary gearset and the second gearset component of the fourth planetary gearset; a fifth selective coupler which, when engaged, fixedly couples the second gearset component of the second planetary gearset to the first gearset component of the third planetary gearset; and a sixth selective coupler which, when engaged, fixedly couples the second gearset component of the first planetary gearset to the third gearset component of the second planetary gearset.

According to yet another exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The third gearset component of the third planetary gearset is fixedly coupled to the at least one stationary member. The output member is fixedly coupled to the third gearset component of the fourth planetary gearset. The transmission further comprising a first interconnector which fixedly couples the first gearset component of the first planetary gearset, the first gearset component of the second planetary gearset, and the first gearset component of the fourth planetary gearset together; a second interconnector which fixedly couples the first gearset component of the third planetary gearset to the second gearset component of the second planetary gearset; and a plurality of selective couplers. The plurality of selective couplers includes a first selective coupler which, when engaged, fixedly couples the first gearset component of the third planetary gearset and the second gearset component of the second planetary gearset to the at least one stationary member; a second selective coupler which, when engaged, fixedly couples the third gearset component of the second planetary gearset to the at least one stationary member; a third selective coupler which, when engaged, fixedly couples the second gearset component of the fourth planetary gearset to the third gearset component of the first planetary gearset; a fourth selective coupler which, when engaged, fixedly couples the second gearset component of the third planetary gearset to the second gearset component of the fourth planetary gearset; a fifth selective coupler which, when engaged, fixedly couples the second gearset component of the first planetary gearset to the second gearset component of the fourth planetary gearset; and a sixth selective coupler which, when engaged, fixedly couples the second gearset component of the first planetary gearset to the third gearset component of the second planetary gearset.

According to still another exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The second gearset component of the second planetary gearset is fixedly coupled to the at least one stationary member. The output member is fixedly coupled to the third gearset component of the fourth planetary gearset. The transmission further comprising a first interconnector which fixedly couples the third gearset component of the second planetary gearset to the second gearset component of the fourth planetary gearset; a second interconnector which fixedly couples the third gearset component of the third planetary gearset to the first gearset component of the fourth planetary gearset; a third interconnector which fixedly couples the second gearset component of the first planetary gearset to the first gearset component of the third planetary gearset; and a plurality of selective couplers. The plurality of selective couplers includes a first selective coupler which, when engaged, fixedly couples the second gearset component of the first planetary gearset and the first gearset component of the third planetary gearset to the at least one stationary member; a second selective coupler which, when engaged, fixedly couples the first gearset component of the first planetary gearset to the at least one stationary member; a third selective coupler which, when engaged, fixedly couples the third gearset component of the first planetary gearset to the second gearset component of the fourth planetary gearset and the third gearset component of the second planetary gearset; a fourth selective coupler which, when engaged, fixedly couples the second gearset component of the third planetary gearset to the second gearset component of the fourth planetary gearset and the third gearset component of the second planetary gearset; a fifth selective coupler which, when engaged, fixedly couples the second gearset component of the first planetary gearset and the first gearset component of the third planetary gearset to one of the second gearset component of the third planetary gearset and the third gearset component of the third planetary gearset; and a sixth selective coupler which, when engaged, fixedly couples the first gearset component of the first planetary gearset to the first gearset component of the second planetary gearset.

According to yet still another exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The second gearset component of the second planetary gearset is fixedly coupled to the at least one stationary member. The output member is fixedly coupled to the second gearset component of the third planetary gearset. The transmission further comprising a first interconnector which fixedly couples the first gearset component of the first planetary gearset to the first gearset component of the second planetary gearset; a second interconnector which fixedly couples the first gearset component of the third planetary gearset, the third gearset component of the second planetary gearset, and the first gearset component of the fourth planetary gearset together; and a plurality of selective couplers. The plurality of selective couplers includes a first selective coupler which, when engaged, fixedly couples the first gearset component of the third planetary gearset, the third gearset component of the second planetary gearset, and the first gearset component of the fourth planetary gearset to the at least one stationary member; a second selective coupler which, when engaged, fixedly couples the second gearset component of the first planetary gearset to the at least one stationary member; a third selective coupler which, when engaged, fixedly couples the third gearset component of the first planetary gearset to the second gearset component of the fourth planetary gearset; a fourth selective coupler which, when engaged, fixedly couples the third gearset component of the fourth planetary gearset to the second gearset component of the third planetary gearset; a fifth selective coupler which, when engaged, fixedly couples the second gearset component of the first planetary gearset to the second gearset component of the fourth planetary gearset; and a sixth selective coupler which, when engaged, fixedly couples the third gearset component of the third planetary gearset to the second gearset component of the fourth planetary gearset.

According to a further exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The second gearset component of the second planetary gearset is fixedly coupled to the at least one stationary member. The output member is fixedly coupled to the second gearset component of the third planetary gearset. The transmission further comprising a first interconnector which fixedly couples the first gearset component of the first planetary gearset to the first gearset component of the second planetary gearset; a second interconnector which fixedly couples the third gearset component of the second planetary gearset to the first gearset component of the fourth planetary gearset; a third interconnector which fixedly couples the first gearset component of the third planetary gearset to the third gearset component of the fourth planetary gearset; and a plurality of selective couplers. The plurality of selective couplers includes a first selective coupler which, when engaged, fixedly couples the first gearset component of the first planetary gearset and the first gearset component of the second planetary gearset to the at least one stationary member; a second selective coupler which, when engaged, fixedly couples the second gearset component of the first planetary gearset to the at least one stationary member; a third selective coupler which, when engaged, fixedly couples the third gearset component of the first planetary gearset to the third gearset component of the third planetary gearset; a fourth selective coupler which, when engaged, fixedly couples the second gearset component of the third planetary gearset to the second gearset component of the fourth planetary gearset; a fifth selective coupler which, when engaged, fixedly couples the third gearset component of the second planetary gearset and the first gearset component of the fourth planetary gearset to one of the second gearset component of the fourth planetary gearset and the third gearset component of the fourth planetary gearset; and a sixth selective coupler which, when engaged, fixedly couples the second gearset component of the first planetary gearset to the third gearset component of the third planetary gearset.

According to still a further exemplary embodiment of the present disclosure, a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The second gearset component of the second planetary gearset is fixedly coupled to the at least one stationary member. The output member is fixedly coupled to the third gearset component of the fourth planetary gearset. The transmission further comprises a first interconnector which fixedly couples the third gearset component of the second planetary gearset, the second gearset component of the third planetary gearset, and the second gearset component of the fourth planetary gearset together; a second interconnector which fixedly couples the second gearset component of the first planetary gearset to the first gearset component of the third planetary gearset; and a plurality of selective couplers. The plurality of selective couplers includes a first selective coupler which, when engaged, fixedly couples the second gearset component of the first planetary gearset and the first gearset component of the third planetary gearset to the at least one stationary member; a second selective coupler which, when engaged, fixedly couples the first gearset component of the first planetary gearset to the at least one stationary member; a third selective coupler which, when engaged, fixedly couples the third gearset component of the first planetary gearset to the third gearset component of the second planetary gearset, the second gearset component of the third planetary gearset, and the second gearset component of the fourth planetary gearset; a fourth selective coupler which, when engaged, fixedly couples the second gearset component of the first planetary gearset and the first gearset component of the third planetary gearset to the first gearset component of the fourth planetary gearset; a fifth selective coupler which, when engaged, fixedly couples the first gearset component of the second planetary gearset to the first gearset component of the first planetary gearset; and a sixth selective coupler which, when engaged, fixedly couples the third gearset component of the third planetary gearset to the first gearset component of the fourth planetary gearset.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the six selective couplers of FIG. 1 to provide ten forward gear or speed ratios and a reverse gear or speed ratio of the multi-speed transmission of FIG. 1;

FIG. 4 is a truth table illustrating the selective engagement of the six selective couplers of FIG. 3 to provide nine forward gear or speed ratios and a reverse gear or speed ratio of the multi-speed transmission of FIG. 3;

FIG. 6 is a truth table illustrating the selective engagement of the six selective couplers of FIG. 5 to provide ten forward gear or speed ratios and a reverse gear or speed ratio of the multi-speed transmission of FIG. 5;

FIG. 8 is a truth table illustrating the selective engagement of the six selective couplers of FIG. 7 to provide ten forward gear or speed ratios and a reverse gear or speed ratio of the multi-speed transmission of FIG. 7;

FIG. 10 is a truth table illustrating the selective engagement of the six selective couplers of FIG. 9 to provide ten forward gear or speed ratios and a reverse gear or speed ratio of the multi-speed transmission of FIG. 9;

FIG. 12 is a truth table illustrating the selective engagement of the six selective couplers of FIG. 11 to provide ten forward gear or speed ratios and a reverse gear or speed ratio of the multi-speed transmission of FIG. 11.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
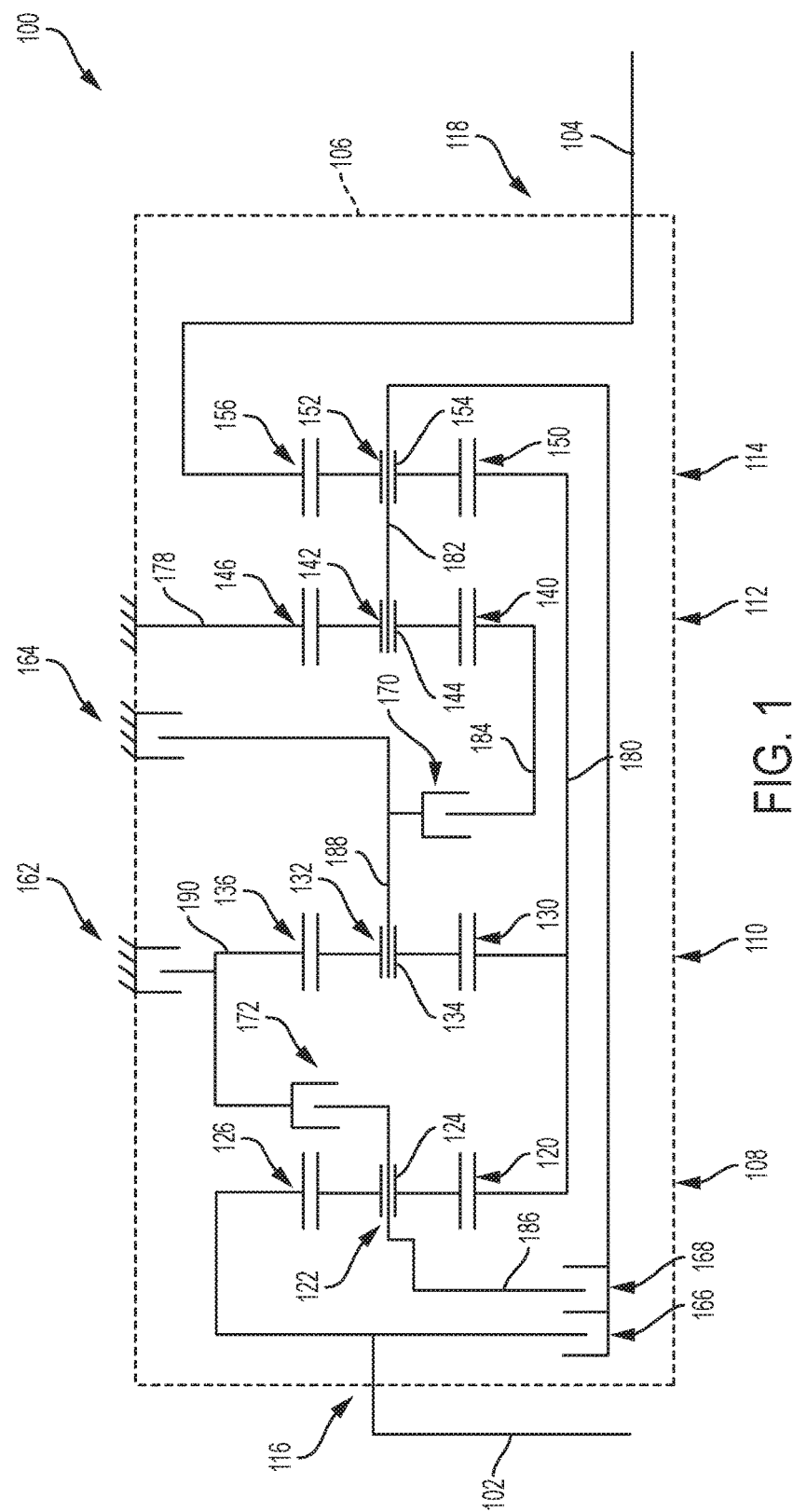
FIG. 1 is a diagrammatic view of an exemplary multi-speed transmission including four planetary gearsets and six selective couplers.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the disclosed transmission embodiments, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated US Published Patent Application No. 2016/0047440.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiments are capable of transferring torque from the input member to the output member and rotating the output member in at least nine forward gear or speed ratios relative to the input member, illustratively ten forward gear or speed ratios in some embodiments, and one reverse gear or speed ratio wherein the rotation direction of the output member is reversed relative to its rotation direction for the at least nine forward ratios. Exemplary gear ratios that may be obtained using the embodiments of the present disclosure are disclosed herein. Of course, other gear ratios are achievable depending on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, and a fourth planetary gearset 114. In one embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, and fourth planetary gearset 114 is positioned between third planetary gearset 112 and a second location or end 118 at which output member 104 exits stationary member 106. In alternative embodiments, first planetary gearset 108, second planetary gearset 110, third planetary gearset 112, and fourth planetary gearset 114 are arranged in any order relative to location 116 and location 118. In the illustrated embodiment of FIG. 1, each of first planetary gearset 108, second planetary gearset 110, third planetary gearset 112, and fourth planetary gearset 114 are axially aligned. In one example, input member 102 and output member 104 are also axially aligned with first planetary gearset 108, second planetary gearset 110, third planetary gearset 112, and fourth planetary gearset 114. In alternative embodiments, one or more of input member 102, output member 104, first planetary gearset 108, second planetary gearset 110, third planetary gearset 112, and fourth planetary gearset 114 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162 and second selective coupler 164 are brakes and third selective coupler 166, fourth selective coupler 168, fifth selective coupler 170, and sixth selective coupler 172 are clutches. The axial locations of the clutches and brakes relative to the plurality of planetary gearsets may be altered from the illustrated axial locations.

Multi-speed transmission 100 includes several components that are illustratively shown as being fixedly coupled together. Input member 102 is fixedly coupled to ring gear 126 of first planetary gearset 108 and third selective coupler 166. Output member 104 is fixedly coupled to ring gear 156 of fourth planetary gearset 114. Sun gear 120 of first planetary gearset 108, sun gear 130 of second planetary gearset 110, and sun gear 150 of fourth planetary gearset 114 are fixedly coupled together. Planet carrier 142 of third planetary gearset 112, planet carrier 152 of fourth planetary gearset 114, third selective coupler 166, and fourth selective coupler 168 are fixedly coupled together. Sun gear 140 of third planetary gearset 112 and fifth selective coupler 170 are fixedly coupled together. Planet carrier 122 of first planetary gearset 108, fourth selective coupler 168, and sixth selective coupler 172 are fixedly coupled together. Planet carrier 132 of second planetary gearset 110, second selective coupler 164, and fifth selective coupler 170 are fixedly coupled together. Ring gear 136 of second planetary gearset 110, first selective coupler 162, and sixth selective coupler 172 are fixedly coupled together. Ring gear 146 of third planetary gearset 112 is fixedly coupled to at least one stationary member 106.

Multi-speed transmission 100 may be described as having nine interconnectors. Input member 102 is a first interconnector that both provides input torque to multi-speed transmission 100 and is fixedly coupled to ring gear 126 of first planetary gearset 108 and third selective coupler 166. Output member 104 is a second interconnector that both provides output torque from multi-speed transmission 100 and is fixedly coupled to ring gear 156 of fourth planetary gearset 114. A third interconnector 180 fixedly couples sun gear 120 of first planetary gearset 108, sun gear 130 of second planetary gearset 110, and sun gear 150 of fourth planetary gearset 114 together. A fourth interconnector 182 fixedly couples planet carrier 142 of third planetary gearset 112, planet carrier 152 of fourth planetary gearset 114, third selective coupler 166, and fourth selective coupler 168 together. A fifth interconnector 184 fixedly couples sun gear 140 of third planetary gearset 112 and fifth selective coupler 170 together. A sixth interconnector 186 fixedly couples planet carrier 122 of first planetary gearset 108, fourth selective coupler 168, and sixth selective coupler 172 together. A seventh interconnector 188 fixedly couples planet carrier 132 of second planetary gearset 110, second selective coupler 164, and fifth selective coupler 170 together. An eighth interconnector 190 fixedly couples ring gear 136 of second planetary gearset 110, first selective coupler 162, and sixth selective coupler 172 together. A ninth interconnector 178 fixedly couples ring gear 146 of third planetary gearset 112 to at least one stationary member 106.

Multi-speed transmission 100 further includes several components that are illustratively shown as being selectively coupled together through selective couplers. First selective coupler 162, when engaged, fixedly couples ring gear 136 of second planetary gearset 110 to stationary member 106. When first selective coupler 162 is disengaged, ring gear 136 of second planetary gearset 110 may rotate relative to stationary member 106.

Second selective coupler 164, when engaged, fixedly couples planet carrier 132 of second planetary gearset 110 to stationary member 106. When second selective coupler 164 is disengaged, planet carrier 132 of second planetary gearset 110 may rotate relative to stationary member 106.

Third selective coupler 166, when engaged, fixedly couples ring gear 126 of first planetary gearset 108 to planet carrier 142 of third planetary gearset 112 and planet carrier 152 of fourth planetary gearset 114. When third selective coupler 166 is disengaged, ring gear 126 of first planetary gearset 108 may rotate relative to planet carrier 142 of third planetary gearset 112 and planet carrier 152 of fourth planetary gearset 114.

Fourth selective coupler 168, when engaged, fixedly couples planet carrier 122 of first planetary gearset 108 to planet carrier 142 of third planetary gearset 112 and planet carrier 152 of fourth planetary gearset 114. When fourth selective coupler 168 is disengaged, planet carrier 122 of first planetary gearset 108 may rotate relative to planet carrier 142 of third planetary gearset 112 and planet carrier 152 of fourth planetary gearset 114.

Fifth selective coupler 170, when engaged, fixedly couples planet carrier 132 of second planetary gearset 110 to sun gear 140 of third planetary gearset 112. When fifth selective coupler 170 is disengaged, planet carrier 132 of second planetary gearset 110 may rotate relative to sun gear 140 of third planetary gearset 112.

Sixth selective coupler 172, when engaged, fixedly couples planet carrier 122 of first planetary gearset 108 to ring gear 136 of second planetary gearset 110. When sixth selective coupler 172 is disengaged, planet carrier 122 of first planetary gearset 108 may rotate relative to ring gear 136 of second planetary gearset 110.

By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least nine forward gear or speed ratios and one reverse gear or speed ratio. Referring to FIG. 2, an exemplary truth table 200 is shown that provides the state of each of first selective coupler 162, second selective coupler 164, third selective coupler 166, fourth selective coupler 168, fifth selective coupler 170, and sixth selective coupler 172 for ten different forward gear or speed ratios and one reverse gear or speed ratio. Each row corresponds to a given interconnection arrangement for transmission 100. The first column provides the gear range (reverse and $1^{st}$-$10^{th}$ forward gears). The second column provides the gear ratio between the input member 102 and the output member 104. The third column provides the gear step. The six rightmost columns illustrate which ones of the selective couplers 162-172 are engaged ("1" indicates engaged) and which ones of selective couplers 162-172 are disengaged ("(blank)" indicates disengaged). FIG. 2 is only one example of any number of truth tables possible for achieving at least nine forward ratios and one reverse ratio.

In the example of FIG. 2, the illustrated reverse ratio (Rev) is achieved by having third selective coupler 166, fifth selective coupler 170, and sixth selective coupler 172 in an engaged configuration and first selective coupler 162, second selective coupler 164, and fourth selective coupler 168 in a disengaged configuration.

In one embodiment, to place multi-speed transmission 100 in neutral (Neu), all of first selective coupler 162, second selective coupler 164, third selective coupler 166, fourth selective coupler 168, fifth selective coupler 170, and sixth selective coupler 172 are in the disengaged configuration. One or more of first selective coupler 162, second selective coupler 164, third selective coupler 166, fourth selective coupler 168, fifth selective coupler 170, and sixth selective coupler 172 may remain engaged in neutral (Neu) as long as the combination of first selective coupler 162, second selective coupler 164, third selective coupler 166, fourth selective coupler 168, fifth selective coupler 170, and sixth selective coupler 172 does not transmit torque from input member 102 to output member 104.

A first forward ratio (shown as 1st) in truth table 200 of FIG. 2 is achieved by having second selective coupler 164, fifth selective coupler 170, and sixth selective coupler 172 in an engaged configuration and first selective coupler 162, third selective coupler 166, and fourth selective coupler 168 in a disengaged configuration.

A second or subsequent forward ratio (shown as 2nd) in truth table 200 of FIG. 2 is achieved by having first selective coupler 162, fifth selective coupler 170, and sixth selective coupler 172 in an engaged configuration and second selective coupler 164, third selective coupler 166, and fourth selective coupler 168 in a disengaged configuration. Therefore, when transitioning between the first forward ratio and the second forward ratio, second selective coupler 164 is placed in the disengaged configuration and first selective coupler 162 is placed in the engaged configuration.

A third or subsequent forward ratio (shown as 3rd) in truth table 200 of FIG. 2 is achieved by having fourth selective coupler 168, fifth selective coupler 170, and sixth selective coupler 172 in an engaged configuration and first selective coupler 162, second selective coupler 164, and third selective coupler 166 in a disengaged configuration. Therefore, when transitioning between the second forward ratio and the third forward ratio, first selective coupler 162 is placed in the disengaged configuration and fourth selective coupler 168 is placed in the engaged configuration.

A fourth or subsequent forward ratio (shown as 4th) in truth table 200 of FIG. 2 is achieved by having second selective coupler 164, fourth selective coupler 168, and fifth selective coupler 170 in an engaged configuration and first selective coupler 162, third selective coupler 166, and sixth selective coupler 172 in a disengaged configuration. Therefore, when transitioning between the third forward ratio and the fourth forward ratio, sixth selective coupler 172 is placed in the disengaged configuration and second selective coupler 164 is placed in the engaged configuration.

A fifth or subsequent forward ratio (shown as 5th) in truth table 200 of FIG. 2 is achieved by having second selective coupler 164, fourth selective coupler 168, and sixth selective coupler 172 in an engaged configuration and first selective coupler 162, third selective coupler 166, and fifth selective coupler 170 in a disengaged configuration. Therefore, when transitioning between the fourth forward ratio and the fifth forward ratio, fifth selective coupler 170 is placed in the disengaged configuration and sixth selective coupler 172 is placed in the engaged configuration.

A sixth or subsequent forward ratio (shown as 6th) in truth table 200 of FIG. 2 is achieved by having first selective coupler 162, second selective coupler 164, and fourth selective coupler 168 in an engaged configuration and third selective coupler 166, fifth selective coupler 170, and sixth selective coupler 172 in a disengaged configuration. Therefore, when transitioning between the fifth forward ratio and the sixth forward ratio, sixth selective coupler 172 is placed in the disengaged configuration and first selective coupler 162 is placed in the engaged configuration.

A seventh or subsequent forward ratio (shown as 7th) in truth table 200 of FIG. 2 is achieved by having second selective coupler 164, third selective coupler 166, and fourth selective coupler 168 in an engaged configuration and first selective coupler 162, fifth selective coupler 170, and sixth selective coupler 172 in a disengaged configuration. Therefore, when transitioning between the sixth forward ratio and the seventh forward ratio, first selective coupler 162 is placed in the disengaged configuration and third selective coupler 166 is placed in the engaged configuration.

An eighth or subsequent forward ratio (shown as 8th) in truth table 200 of FIG. 2 is achieved by having first selective coupler 162, second selective coupler 164, and third selective coupler 166 in an engaged configuration and fourth selective coupler 168, fifth selective coupler 170, and sixth selective coupler 172 in a disengaged configuration. Therefore, when transitioning between the seventh forward ratio and the eighth forward ratio, fourth selective coupler 168 is placed in the disengaged configuration and first selective coupler 162 is placed in the engaged configuration.

A ninth or subsequent forward ratio (shown as 9th) in truth table 200 of FIG. 2 is achieved by having second selective coupler 164, third selective coupler 166, and sixth selective coupler 172 in an engaged configuration and first selective coupler 162, fourth selective coupler 168, and fifth selective coupler 170 in a disengaged configuration. Therefore, when transitioning between the eighth forward ratio and the ninth forward ratio, first selective coupler 162 is placed in the disengaged configuration and sixth selective coupler 172 is placed in the engaged configuration.

A tenth or subsequent forward ratio (shown as 10th) in truth table 200 of FIG. 2 is achieved by having first selective coupler 162, third selective coupler 166, and sixth selective coupler 172 in an engaged configuration and second selective coupler 164, fourth selective coupler 168, and fifth selective coupler 170 in a disengaged configuration. Therefore, when transitioning between the ninth forward ratio and the tenth forward ratio, second selective coupler 164 is placed in the disengaged configuration and first selective coupler 162 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

Figure 3:
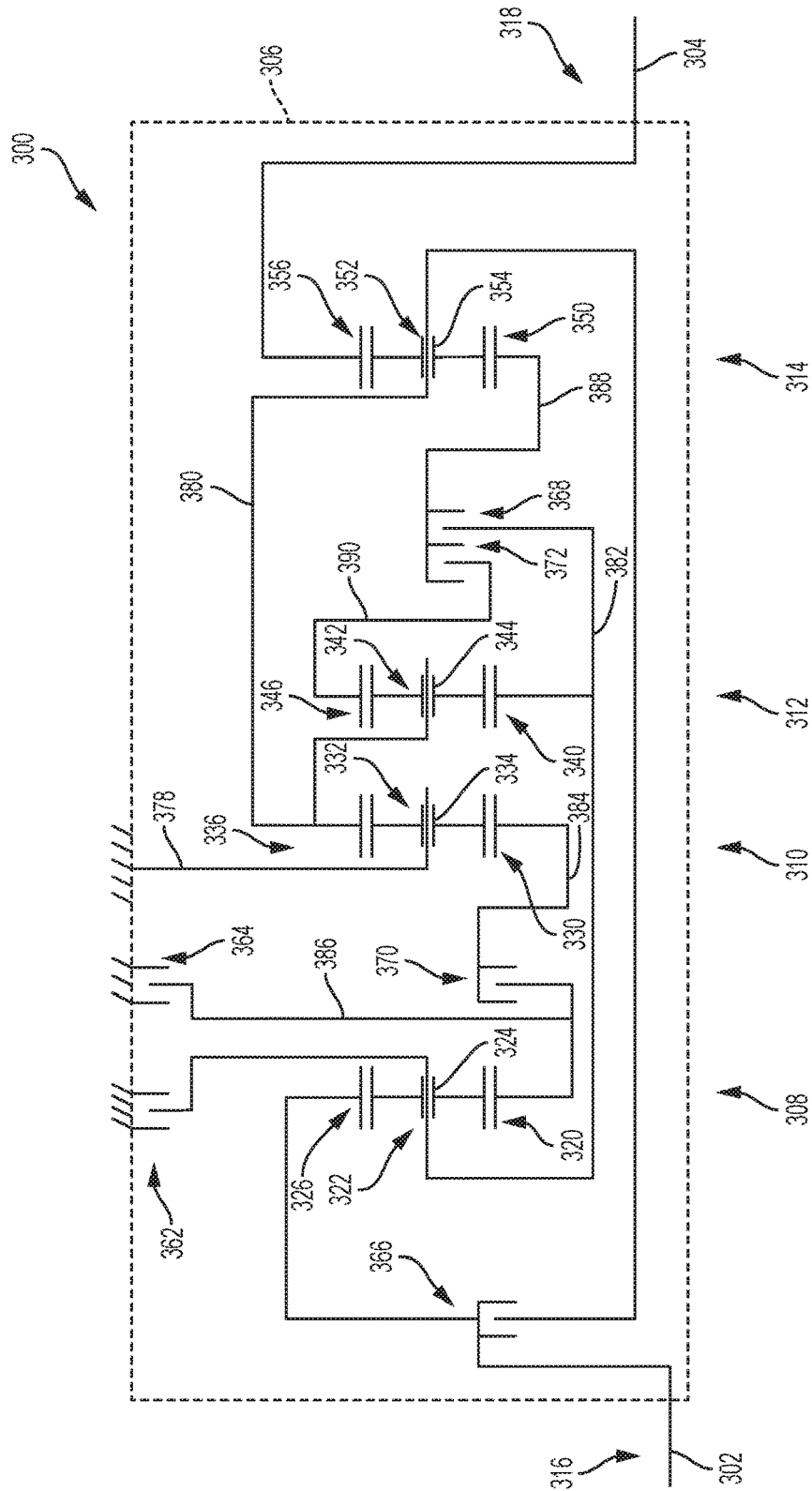
FIG. 3 is a diagrammatic view of another exemplary multi-speed transmission including four planetary gearsets and six selective couplers.

FIG. 3 is a diagrammatic representation of a multi-speed transmission 300. Multi-speed transmission 300 includes an input member 302 and an output member 304. Each of input member 302 and output member 304 is rotatable relative to at least one stationary member 306. An exemplary input member 302 is an input shaft or other suitable rotatable component. An exemplary output member 304 is an output shaft or other suitable rotatable component. An exemplary stationary member 306 is a housing of multi-speed transmission 300. The housing may include several components coupled together.

Multi-speed transmission 300 includes a plurality of planetary gearsets, illustratively a first planetary gearset 308, a second planetary gearset 310, a third planetary gearset 312, and a fourth planetary gearset 314. In one embodiment, additional planetary gearsets may be included. Further, although first planetary gearset 308, second planetary gearset 310, third planetary gearset 312, and fourth planetary gearset 314 are illustrated as simple planetary gearsets, it is contemplated that compound planetary gearsets may be included in some embodiments.

In one embodiment, multi-speed transmission 300 is arranged as illustrated in FIG. 3, with first planetary gearset 308 positioned between a first location or end 316 at which input member 302 enters stationary member 306 and second planetary gearset 310, second planetary gearset 310 is positioned between first planetary gearset 308 and third planetary gearset 312, third planetary gearset 312 is positioned between second planetary gearset 310 and fourth planetary gearset 314, and fourth planetary gearset 314 is positioned between third planetary gearset 312 and a second location or end 318 at which output member 304 exits stationary member 306. In alternative embodiments, first planetary gearset 308, second planetary gearset 310, third planetary gearset 312, and fourth planetary gearset 314 are arranged in any order relative to location 316 and location 318. In the illustrated embodiment of FIG. 3, each of first planetary gearset 308, second planetary gearset 310, third planetary gearset 312, and fourth planetary gearset 314 are axially aligned. In one example, input member 302 and output member 304 are also axially aligned with first planetary gearset 308, second planetary gearset 310, third planetary gearset 312, and fourth planetary gearset 314. In alternative embodiments, one or more of input member 302, output member 304, first planetary gearset 308, second planetary gearset 310, third planetary gearset 312, and fourth planetary gearset 314 are offset and not axially aligned with the remainder.

First planetary gearset 308 includes a sun gear 320, a planet carrier 322 supporting a plurality of planet gears 324, and a ring gear 326. Second planetary gearset 310 includes a sun gear 330, a planet carrier 332 supporting a plurality of planet gears 334, and a ring gear 336. Third planetary gearset 312 includes a sun gear 340, a planet carrier 342 supporting a plurality of planet gears 344, and a ring gear 346. Fourth planetary gearset 314 includes a sun gear 350, a planet carrier 352 supporting a plurality of planet gears 354, and a ring gear 356.

Multi-speed transmission 300 further includes a plurality of selective couplers, illustratively a first selective coupler 362, a second selective coupler 364, a third selective coupler 366, a fourth selective coupler 368, a fifth selective coupler 370, and a sixth selective coupler 372. In the illustrated embodiment, first selective coupler 362 and second selective coupler 364 are brakes and third selective coupler 366, fourth selective coupler 368, fifth selective coupler 370, and sixth selective coupler 372 are clutches. The axial locations of the clutches and brakes relative to the plurality of planetary gearsets may be altered from the illustrated axial locations.

Multi-speed transmission 300 includes several components that are illustratively shown as being fixedly coupled together. Input member 302 is fixedly coupled to ring gear 326 of first planetary gearset 308 and third selective coupler 366. Output member 304 is fixedly coupled to ring gear 356 of fourth planetary gearset 314. ring gear 336 of second planetary gearset 310, planet carrier 342 of third planetary gearset 312, planet carrier 352 of fourth planetary gearset 314, and third selective coupler 366 are fixedly coupled together. Planet carrier 322 of first planetary gearset 308, sun gear 340 of third planetary gearset 312, first selective coupler 362, and fourth selective coupler 368 are fixedly coupled together. Sun gear 330 of second planetary gearset 310 and fifth selective coupler 370 are fixedly coupled together. Sun gear 320 of first planetary gearset 308, second selective coupler 364, and fifth selective coupler 370 are fixedly coupled together. Sun gear 350 of fourth planetary gearset 314, fourth selective coupler 368, and sixth selective coupler 372 are fixedly coupled together. Ring gear 346 of third planetary gearset 312 and sixth selective coupler 372 are fixedly coupled together. Planet carrier 332 of second planetary gearset 310 is fixedly coupled to at least one stationary member 306.

Multi-speed transmission 300 may be described as having nine interconnectors. Input member 302 is a first interconnector that both provides input torque to multi-speed transmission 300 and is fixedly coupled to ring gear 326 of first planetary gearset 308 and third selective coupler 366. Output member 304 is a second interconnector that both provides output torque from multi-speed transmission 300 and is fixedly coupled to ring gear 356 of fourth planetary gearset 314. A third interconnector 380 fixedly couples ring gear 336 of second planetary gearset 310, planet carrier 342 of third planetary gearset 312, planet carrier 352 of fourth planetary gearset 314, and third selective coupler 366 together. A fourth interconnector 382 fixedly couples planet carrier 322 of first planetary gearset 308, sun gear 340 of third planetary gearset 312, first selective coupler 362, and fourth selective coupler 368 together. A fifth interconnector 384 fixedly couples sun gear 330 of second planetary gearset 310 and fifth selective coupler 370 together. A sixth interconnector 386 fixedly couples sun gear 320 of first planetary gearset 308, second selective coupler 364, and fifth selective coupler 370 together. A seventh interconnector 388 fixedly couples sun gear 350 of fourth planetary gearset 314, fourth selective coupler 368, and sixth selective coupler 372 together. An eighth interconnector 390 fixedly couples ring gear 346 of third planetary gearset 312 and sixth selective coupler 372 together. A ninth interconnector 378 fixedly couples planet carrier 332 of second planetary gearset 310 to at least one stationary member 306.

Multi-speed transmission 300 further includes several components that are illustratively shown as being selectively coupled together through selective couplers. First selective coupler 362, when engaged, fixedly couples planet carrier 322 of first planetary gearset 308 and sun gear 340 of third planetary gearset 312 to stationary member 306. When first selective coupler 362 is disengaged, planet carrier 322 of first planetary gearset 308 and sun gear 340 of third planetary gearset 312 may rotate relative to stationary member 306.

Second selective coupler 364, when engaged, fixedly couples sun gear 320 of first planetary gearset 308 to stationary member 306. When second selective coupler 364 is disengaged, sun gear 320 of first planetary gearset 308 may rotate relative to stationary member 306.

Third selective coupler 366, when engaged, fixedly couples ring gear 326 of first planetary gearset 308 to planet carrier 352 of fourth planetary gearset 314, ring gear 336 of second planetary gearset 310, and planet carrier 342 of third planetary gearset 312. When third selective coupler 366 is disengaged, ring gear 326 of first planetary gearset 308 may rotate relative to planet carrier 352 of fourth planetary gearset 314, ring gear 336 of second planetary gearset 310, and planet carrier 342 of third planetary gearset 312.

Fourth selective coupler 368, when engaged, fixedly couples planet carrier 322 of first planetary gearset 308 and sun gear 340 of third planetary gearset 312 to sun gear 350 of fourth planetary gearset 314. When fourth selective coupler 368 is disengaged, planet carrier 322 of first planetary gearset 308 and sun gear 340 of third planetary gearset 312 may rotate relative to sun gear 350 of fourth planetary gearset 314.

Fifth selective coupler 370, when engaged, fixedly couples sun gear 320 of first planetary gearset 308 to sun gear 330 of second planetary gearset 310. When fifth selective coupler 370 is disengaged, sun gear 320 of first planetary gearset 308 may rotate relative to sun gear 330 of second planetary gearset 310.

Sixth selective coupler 372, when engaged, fixedly couples ring gear 346 of third planetary gearset 312 to sun gear 350 of fourth planetary gearset 314. When sixth selective coupler 372 is disengaged, ring gear 346 of third planetary gearset 312 may rotate relative to sun gear 350 of fourth planetary gearset 314.

By engaging various combinations of first selective coupler 362, second selective coupler 364, third selective coupler 366, fourth selective coupler 368, fifth selective coupler 370, and sixth selective coupler 372, additional components of multi-speed transmission 300 may be fixedly coupled together.

The plurality of planetary gearsets and the plurality of selective couplers of multi-speed transmission 300 may be interconnected in various arrangements to provide torque from input member 302 to output member 304 in at least nine forward gear or speed ratios and one reverse gear or speed ratio. Referring to FIG. 4, an exemplary truth table 400 is shown that provides the state of each of first selective coupler 362, second selective coupler 364, third selective coupler 366, fourth selective coupler 368, fifth selective coupler 370, and sixth selective coupler 372 for ten different forward gear or speed ratios and one reverse gear or speed ratio. Each row corresponds to a given interconnection arrangement for transmission 300. The first column provides the gear range (reverse and $1^{st}$-$10^{th}$ forward gears). The second column provides the gear ratio between the input member 302 and the output member 304. The third column provides the gear step. The six rightmost columns illustrate which ones of the selective couplers 362-372 are engaged ("1" indicates engaged) and which ones of selective couplers 362-372 are disengaged ("(blank)" indicates disengaged). FIG. 4 is only one example of any number of truth tables possible for achieving at least nine forward ratios and one reverse ratio.

In the example of FIG. 4, the illustrated reverse ratio (Rev) is achieved by having second selective coupler 364, fourth selective coupler 368, and fifth selective coupler 370 in an engaged configuration and first selective coupler 362, third selective coupler 366, and sixth selective coupler 372 in a disengaged configuration.

In one embodiment, to place multi-speed transmission 300 in neutral (Neu), all of first selective coupler 362, second selective coupler 364, third selective coupler 366, fourth selective coupler 368, fifth selective coupler 370, and sixth selective coupler 372 are in the disengaged configuration. One or more of first selective coupler 362, second selective coupler 364, third selective coupler 366, fourth selective coupler 368, fifth selective coupler 370, and sixth selective coupler 372 may remain engaged in neutral (Neu)

as long as the combination of first selective coupler 362, second selective coupler 364, third selective coupler 366, fourth selective coupler 368, fifth selective coupler 370, and sixth selective coupler 372 does not transmit torque from input member 302 to output member 304.

A first forward ratio (shown as 1st) in truth table 400 of FIG. 4 is achieved by having second selective coupler 364, fifth selective coupler 370, and sixth selective coupler 372 in an engaged configuration and first selective coupler 362, third selective coupler 366, and fourth selective coupler 368 in a disengaged configuration.

A second or subsequent forward ratio (shown as 2nd) in truth table 400 of FIG. 4 is achieved by having fourth selective coupler 368, fifth selective coupler 370, and sixth selective coupler 372 in an engaged configuration, and first selective coupler 362, second selective coupler 364, and third selective coupler 366 in a disengaged configuration. Therefore, when transitioning between the first forward ratio and the second forward ratio, second selective coupler 364 is placed in the disengaged configuration and fourth selective coupler 368 is placed in the engaged configuration.

A third or subsequent forward ratio (shown as 3rd) in truth table 400 of FIG. 4 is achieved by having first selective coupler 362, fifth selective coupler 370, and sixth selective coupler 372 in an engaged configuration and second selective coupler 364, third selective coupler 366, and fourth selective coupler 368 in a disengaged configuration. Therefore, when transitioning between the second forward ratio and the third forward ratio, fourth selective coupler 368 is placed in the disengaged configuration and first selective coupler 362 is placed in the engaged configuration.

A fourth or subsequent forward ratio (shown as 4th) in truth table 400 of FIG. 4 is achieved by having third selective coupler 366, fifth selective coupler 370, and sixth selective coupler 372 in an engaged configuration and first selective coupler 362, second selective coupler 364, and fourth selective coupler 368 in a disengaged configuration. Therefore, when transitioning between the third forward ratio and the fourth forward ratio, first selective coupler 362 is placed in the disengaged configuration and third selective coupler 366 is placed in the engaged configuration.

A fifth or subsequent forward ratio (shown as 5th) in truth table 400 of FIG. 4 is achieved by having first selective coupler 362, third selective coupler 366, and sixth selective coupler 372 in an engaged configuration and second selective coupler 364, fourth selective coupler 368, and fifth selective coupler 370 in a disengaged configuration. Therefore, when transitioning between the fourth forward ratio and the fifth forward ratio, fifth selective coupler 370 is placed in the disengaged configuration and first selective coupler 362 is placed in the engaged configuration.

A sixth or subsequent forward ratio (shown as 6th) in truth table 400 of FIG. 4 is achieved by having second selective coupler 364, third selective coupler 366, sixth selective coupler 372 in an engaged configuration and first selective coupler 362, fourth selective coupler 368, and fifth selective coupler 370 in a disengaged configuration. Therefore, when transitioning between the fifth forward ratio and the sixth forward ratio, first selective coupler 362 is placed in the disengaged configuration and second selective coupler 364 is placed in the engaged configuration.

A seventh or subsequent forward ratio (shown as 7th) in truth table 400 of FIG. 4 is achieved by having third selective coupler 366, fourth selective coupler 368, sixth selective coupler 372 in an engaged configuration and first selective coupler 362, second selective coupler 364, and fifth selective coupler 370 in a disengaged configuration. Therefore, when transitioning between the sixth forward ratio and the seventh forward ratio, second selective coupler 364 is placed in the disengaged configuration and fourth selective coupler 368 is placed in the engaged configuration.

An eighth or subsequent forward ratio (shown as 8th) in truth table 400 of FIG. 4 is achieved by having second selective coupler 364, third selective coupler 366, fourth selective coupler 368 in an engaged configuration and first selective coupler 362, fifth selective coupler 370, and sixth selective coupler 372 in a disengaged configuration. Therefore, when transitioning between the seventh forward ratio and the eighth forward ratio, sixth selective coupler 372 is placed in the disengaged configuration and second selective coupler 364 is placed in the engaged configuration.

A ninth or subsequent forward ratio (shown as 9th) in truth table 400 of FIG. 4 is achieved by having first selective coupler 362, third selective coupler 366, and fourth selective coupler 368 in an engaged configuration and second selective coupler 364, fifth selective coupler 370, and sixth selective coupler 372 in a disengaged configuration. Therefore, when transitioning between the eighth forward ratio and the ninth forward ratio, second selective coupler 364 is placed in the disengaged configuration and first selective coupler 362 is placed in the engaged configuration.

A tenth or subsequent forward ratio (shown as 10th) in truth table 400 of FIG. 4 is achieved by having third selective coupler 366, fourth selective coupler 368, and fifth selective coupler 370 in an engaged configuration and first selective coupler 362, second selective coupler 364, and sixth selective coupler 372 in a disengaged configuration. Therefore, when transitioning between the ninth forward ratio and the tenth forward ratio, first selective coupler 362 is placed in the disengaged configuration and fifth selective coupler 370 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

Figure 5:
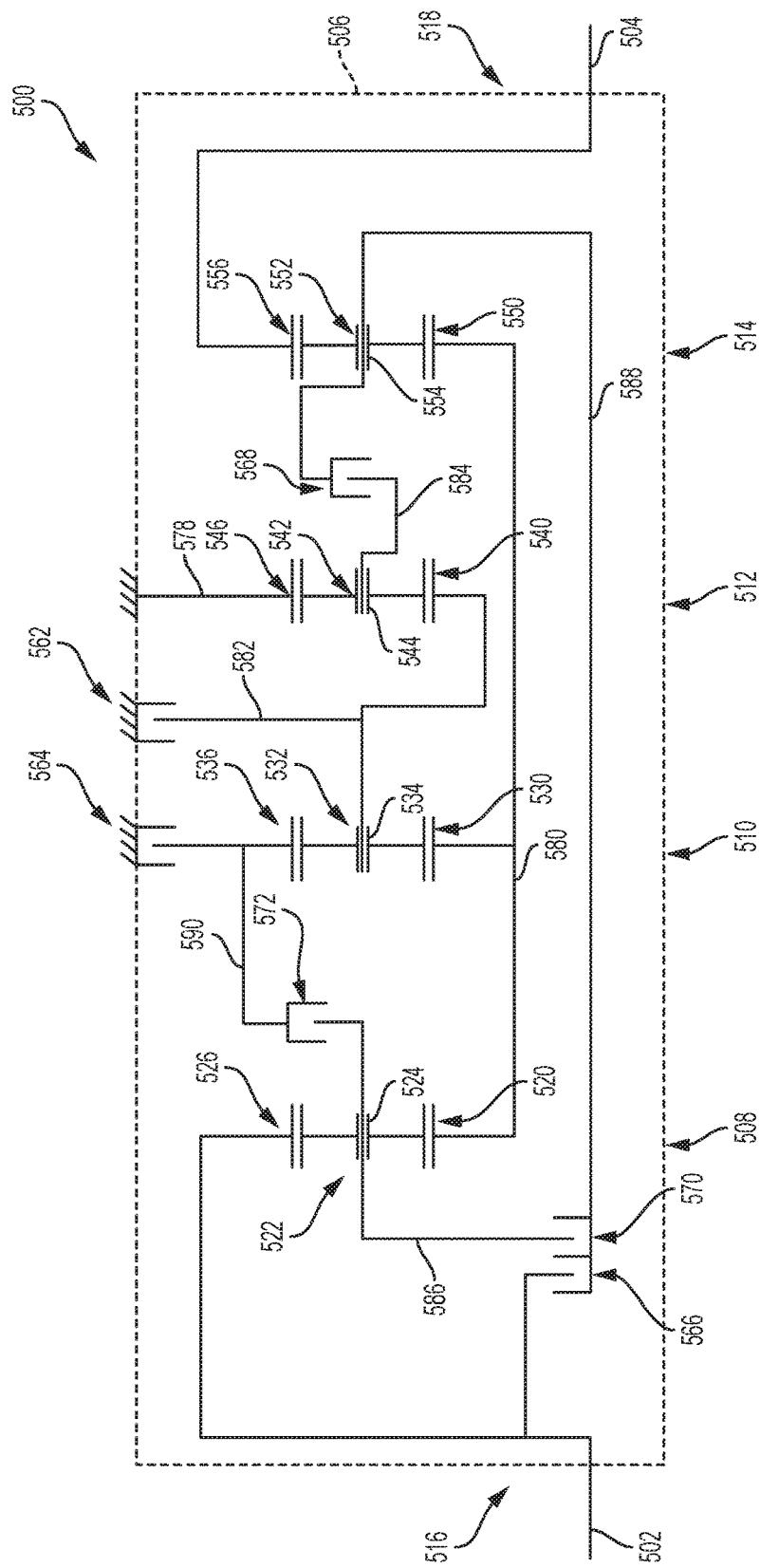
FIG. 5 is a diagrammatic view of an exemplary multi-speed transmission including four planetary gearsets and six selective couplers.

FIG. 5 is a diagrammatic representation of a multi-speed transmission 500. Multi-speed transmission 500 includes an input member 502 and an output member 504. Each of input member 502 and output member 504 is rotatable relative to at least one stationary member 506. An exemplary input member 502 is an input shaft or other suitable rotatable component. An exemplary output member 504 is an output shaft or other suitable rotatable component. An exemplary stationary member 506 is a housing of multi-speed transmission 500. The housing may include several components coupled together.

Multi-speed transmission 500 includes a plurality of planetary gearsets, illustratively a first planetary gearset 508, a second planetary gearset 510, a third planetary gearset 512, and a fourth planetary gearset 514. In one embodiment, additional planetary gearsets may be included. Further, although first planetary gearset 508, second planetary gearset 510, third planetary gearset 512, and fourth planetary gearset 514 are illustrated as simple planetary gearsets, it is contemplated that compound planetary gearsets may be included in some embodiments.

In one embodiment, multi-speed transmission 500 is arranged as illustrated in FIG. 5, with first planetary gearset 508 positioned between a first location or end 516 at which input member 502 enters stationary member 506 and second planetary gearset 510, second planetary gearset 510 is positioned between first planetary gearset 508 and third planetary gearset 512, third planetary gearset 512 is positioned between second planetary gearset 510 and fourth planetary gearset 514, and fourth planetary gearset 514 is positioned between third planetary gearset 512 and a second location or end 518 at which output member 504 exits stationary member 506. In alternative embodiments, first planetary gearset 508, second planetary gearset 510, third planetary gearset 512, and fourth planetary gearset 514 are arranged in any order relative to location 516 and location 518. In the illustrated embodiment of FIG. 5, each of first planetary gearset 508, second planetary gearset 510, third planetary gearset 512, and fourth planetary gearset 514 are axially aligned. In one example, input member 502 and output member 504 are also axially aligned with first planetary gearset 508, second planetary gearset 510, third planetary gearset 512, and fourth planetary gearset 514. In alternative embodiments, one or more of input member 502, output member 504, first planetary gearset 508, second planetary gearset 510, third planetary gearset 512, and fourth planetary gearset 514 are offset and not axially aligned with the remainder.

First planetary gearset 508 includes a sun gear 520, a planet carrier 522 supporting a plurality of planet gears 524, and a ring gear 526. Second planetary gearset 510 includes a sun gear 530, a planet carrier 532 supporting a plurality of planet gears 534, and a ring gear 536. Third planetary gearset 512 includes a sun gear 540, a planet carrier 542 supporting a plurality of planet gears 544, and a ring gear 546. Fourth planetary gearset 514 includes a sun gear 550, a planet carrier 552 supporting a plurality of planet gears 554, and a ring gear 556.

Multi-speed transmission 500 further includes a plurality of selective couplers, illustratively a first selective coupler 562, a second selective coupler 564, a third selective coupler 566, a fourth selective coupler 568, a fifth selective coupler 570, and a sixth selective coupler 572. In the illustrated embodiment, first selective coupler 562 and second selective coupler 564 are brakes and third selective coupler 566, fourth selective coupler 568, fifth selective coupler 570, and sixth selective coupler 572 are clutches. The axial locations of the clutches and brakes relative to the plurality of planetary gearsets may be altered from the illustrated axial locations.

Multi-speed transmission 500 includes several components that are illustratively shown as being fixedly coupled together. Input member 502 is fixedly coupled to ring gear 526 of first planetary gearset 508 and third selective coupler 566. Output member 504 is fixedly coupled to ring gear 556 of fourth planetary gearset 514. Sun gear 520 of first planetary gearset 508, sun gear 530 of second planetary gearset 510, and sun gear 550 of fourth planetary gearset 514 are fixedly coupled together. Planet carrier 532 of second planetary gearset 510, sun gear 540 of third planetary gearset 512, and first selective coupler 562 are fixedly coupled together. Planet carrier 542 0f third planetary gearset 512 and fourth selective coupler 568 are fixedly coupled together. Planet carrier 522 of first planetary gearset 508, fifth selective coupler 570, and sixth selective coupler 572 are fixedly coupled together. Planet carrier 552 of fourth planetary gearset 514, third selective coupler 566, fourth selective coupler 568, and fifth selective coupler 570 are fixedly coupled together. Ring gear 536 of second planetary gearset 510, second selective coupler 564, and sixth selective coupler 572 are fixedly coupled together. Ring gear 546 is fixedly coupled to at least one stationary member 506.

Multi-speed transmission 500 may be described as having nine interconnectors. Input member 502 is a first interconnector that both provides input torque to multi-speed transmission 500 and fixedly couples ring gear 526 of first planetary gearset 508 to third selective coupler 566. Output member 504 is a second interconnector that both provides output torque from multi-speed transmission 500 and is fixedly coupled to ring gear 556 of fourth planetary gearset 514. A third interconnector 580 fixedly couples sun gear 520 of first planetary gearset 508, sun gear 530 of second planetary gearset 510, and sun gear 550 of fourth planetary gearset 514 together. A fourth interconnector 582 fixedly couples planet carrier 532 of second planetary gearset 510, sun gear 540 of third planetary gearset 512 and first selective coupler 562 together. A fifth interconnector 584 fixedly couples planet carrier 542 of third planetary gearset 512 and fourth selective coupler 568 together. A sixth interconnector 586 fixedly couples planet carrier 522 of first planetary gearset 508, fifth selective coupler 570, and sixth selective coupler 572 together. A seventh interconnector 588 fixedly couples planet carrier 552 of fourth planetary gearset 514, third selective coupler 566, fourth selective coupler 568, and fifth selective coupler 570 together. An eighth interconnector 590 fixedly couples ring gear 536 of second planetary gearset 510, second selective coupler 564, and sixth selective coupler 572 together. A ninth interconnector 578 fixedly couples ring gear 546 of third planetary gearset 512 to at least one stationary member 506.

Multi-speed transmission 500 further includes several components that are illustratively shown as being selectively coupled together through selective couplers. First selective coupler 562, when engaged, fixedly couples planet carrier 532 of second planetary gearset 510 and sun gear 540 of third planetary gearset 512 to stationary member 506. When first selective coupler 562 is disengaged, planet carrier 532 of second planetary gearset 510 and sun gear 540 of third planetary gearset 512 may rotate relative to stationary member 506.

Second selective coupler 564, when engaged, fixedly couples ring gear 536 of second planetary gearset 510 to stationary member 506. When second selective coupler 564 is disengaged, ring gear 536 of second planetary gearset 510 may rotate relative to stationary member 506.

Third selective coupler 566, when engaged, fixedly couples ring gear 526 of first planetary gearset 508 to planet carrier 552 of fourth planetary gearset 514. When third selective coupler 566 is disengaged, ring gear 526 of first planetary gearset 508 may rotate relative to planet carrier 552 of fourth planetary gearset 514.

Fourth selective coupler 568, when engaged, fixedly couples planet carrier 542 of third planetary gearset 512 to planet carrier 552 of fourth planetary gearset 514. When fourth selective coupler 568 is disengaged, planet carrier 542 of third planetary gearset 512 may rotate relative to planet carrier 552 of fourth planetary gearset 514.

Fifth selective coupler 570, when engaged, fixedly couples planet carrier 522 of first planetary gearset 508 to planet carrier 552 of fourth planetary gearset 514. When fifth selective coupler 570 is disengaged, planet carrier 522 of first planetary gearset 508 may rotate relative to planet carrier 552 of fourth planetary gearset 514.

Sixth selective coupler 572, when engaged, fixedly couples planet carrier 522 of first planetary gearset 508 to ring gear 536 of second planetary gearset 510. When sixth selective coupler 572 is disengaged, planet carrier 522 of first planetary gearset 508 may rotate relative to ring gear 536 of second planetary gearset 510.

By engaging various combinations of first selective coupler 562, second selective coupler 564, third selective coupler 566, fourth selective coupler 568, fifth selective coupler 570, and sixth selective coupler 572, additional components of multi-speed transmission 500 may be fixedly coupled together.

The plurality of planetary gearsets and the plurality of selective couplers of multi-speed transmission 500 may be interconnected in various arrangements to provide torque from input member 502 to output member 504 in at least nine forward gear or speed ratios and one reverse gear or speed ratio. Referring to FIG. 6, an exemplary truth table 600 is shown that provides the state of each of first selective coupler 562, second selective coupler 564, third selective coupler 566, fourth selective coupler 568, fifth selective coupler 570, and sixth selective coupler 572 for ten different forward gear or speed ratios and one reverse gear or speed ratio. Each row corresponds to a given interconnection arrangement for transmission 500. The first column provides the gear range (reverse and $1^{st}$-$10^{th}$ forward gears). The second column provides the gear ratio between the input member 502 and the output member 504. The third column provides the gear step. The six rightmost columns illustrate which ones of the selective couplers 562-572 are engaged ("1" indicates engaged) and which ones of selective couplers 562-572 are disengaged ("(blank)" indicates disengaged). FIG. 6 is only one example of any number of truth tables possible for achieving at least nine forward ratios and one reverse ratio.

In the example of FIG. 6, the illustrated reverse ratio (Rev) is achieved by having third selective coupler 566, fourth selective coupler 568, and sixth selective coupler 572 in an engaged configuration and first selective coupler 562, second selective coupler 564, and fifth selective coupler 570 in a disengaged configuration.

In one embodiment, to place multi-speed transmission 500 in neutral (Neu), all of first selective coupler 562, second selective coupler 564, third selective coupler 566, fourth selective coupler 568, fifth selective coupler 570, and sixth selective coupler 572 are in the disengaged configuration. One or more of first selective coupler 562, second selective coupler 564, third selective coupler 566, fourth selective coupler 568, fifth selective coupler 570, and sixth selective coupler 572 may remain engaged in neutral (Neu) as long as the combination of first selective coupler 562, second selective coupler 564, third selective coupler 566, fourth selective coupler 568, fifth selective coupler 570, and sixth selective coupler 572 does not transmit torque from input member 502 to output member 504.

A first forward ratio (shown as 1st) in truth table 600 of FIG. 6 is achieved by having first selective coupler 562, fourth selective coupler 568, and sixth selective coupler 572 in an engaged configuration and second selective coupler 564, third selective coupler 566, and fifth selective coupler 570 in a disengaged configuration.

A second or subsequent forward ratio (shown as 2nd) in truth table 600 of FIG. 6 is achieved by having second selective coupler 564, fourth selective coupler 568, and sixth selective coupler 572 in an engaged configuration and first selective coupler 562, third selective coupler 566, and fifth selective coupler 570 in a disengaged configuration. Therefore, when transitioning between the first forward ratio and the second forward ratio, first selective coupler 562 is placed in the disengaged configuration and second selective coupler 564 is placed in the engaged configuration.

A third or subsequent forward ratio (shown as 3rd) in truth table 600 of FIG. 6 is achieved by having second selective coupler 564, fourth selective coupler 568, and fifth selective coupler 570 in an engaged configuration and first selective coupler 562, third selective coupler 566, and sixth selective coupler 572 in a disengaged configuration. Therefore, when transitioning between the second forward ratio and the third forward ratio, sixth selective coupler 572 is placed in the disengaged configuration and fifth selective coupler 570 is placed in the engaged configuration.

A fourth or subsequent forward ratio (shown as 4th) in truth table 600 of FIG. 6 is achieved by having first selective coupler 562, fourth selective coupler 568, and fifth selective coupler 570 in an engaged configuration and second selective coupler 564, third selective coupler 566, and sixth selective coupler 572 in a disengaged configuration. Therefore, when transitioning between the third forward ratio and the fourth forward ratio, second selective coupler 564 is placed in the disengaged configuration and first selective coupler 562 is placed in the engaged configuration.

A fifth or subsequent forward ratio (shown as 5th) in truth table 600 of FIG. 6 is achieved by having first selective coupler 562, fifth selective coupler 570, and sixth selective coupler 572 in an engaged configuration and second selective coupler 564, third selective coupler 566, and fourth selective coupler 568 in a disengaged configuration. Therefore, when transitioning between the fourth forward ratio and the fifth forward ratio, fourth selective coupler 568 is placed in the disengaged configuration and sixth selective coupler 572 is placed in the engaged configuration.

A sixth or subsequent forward ratio (shown as 6th) in truth table 600 of FIG. 6 is achieved by having first selective coupler 562, second selective coupler 564, and fifth selective coupler 570 in an engaged configuration and third selective coupler 566, fourth selective coupler 568, and sixth selective coupler 572 in a disengaged configuration. Therefore, when transitioning between the fifth forward ratio and the sixth forward ratio, sixth selective coupler 572 is placed in the disengaged configuration and second selective coupler 564 is placed in the engaged configuration.

A seventh or subsequent forward ratio (shown as 7th) in truth table 600 of FIG. 6 is achieved by having second selective coupler 564, third selective coupler 566, and fifth selective coupler 570 in an engaged configuration and first selective coupler 562, fourth selective coupler 568, and sixth selective coupler 572 in a disengaged configuration. Therefore, when transitioning between the sixth forward ratio and the seventh forward ratio, first selective coupler 562 is placed in the disengaged configuration and third selective coupler 566 is placed in the engaged configuration.

An eighth or subsequent forward ratio (shown as 8th) in truth table 600 of FIG. 6 is achieved by having first selective coupler 562, second selective coupler 564, and third selective coupler 566 in an engaged configuration and fourth selective coupler 568, fifth selective coupler 570, and sixth selective coupler 572 in a disengaged configuration. Therefore, when transitioning between the seventh forward ratio and the eighth forward ratio, fifth selective coupler 570 is placed in the disengaged configuration and first selective coupler 562 is placed in the engaged configuration.

A ninth or subsequent forward ratio (shown as 9th) in truth table 600 of FIG. 6 is achieved by having first selective coupler 562, third selective coupler 566, and sixth selective coupler 572 in an engaged configuration and second selective coupler 564, fourth selective coupler 568, and fifth selective coupler 570 in a disengaged configuration. Therefore, when transitioning between the eighth forward ratio and the ninth forward ratio, second selective coupler 564 is placed in the disengaged configuration and sixth selective coupler 572 is placed in the engaged configuration.

A tenth or subsequent forward ratio (shown as 10th) in truth table 600 of FIG. 6 is achieved by having second selective coupler 564, third selective coupler 566, and sixth selective coupler 572 in an engaged configuration and first selective coupler 562, fourth selective coupler 568, and fifth selective coupler 570 in a disengaged configuration. Therefore, when transitioning between the ninth forward ratio and the tenth forward ratio, first selective coupler 562 is placed in the disengaged configuration and second selective coupler 564 is placed in the engaged configuration.

The present disclosure contemplates that downshifts follow the reverse sequence of the corresponding upshift (as described above). Further, several power-on skip-shifts that are single-transition are possible (e.g. from $6^{th}$ up to $8^{th}$, from $8^{th}$ down to $6^{th}$, from $8^{th}$ up to $10^{th}$, and from $10^{th}$ down to $8^{th}$).

Figure 7:
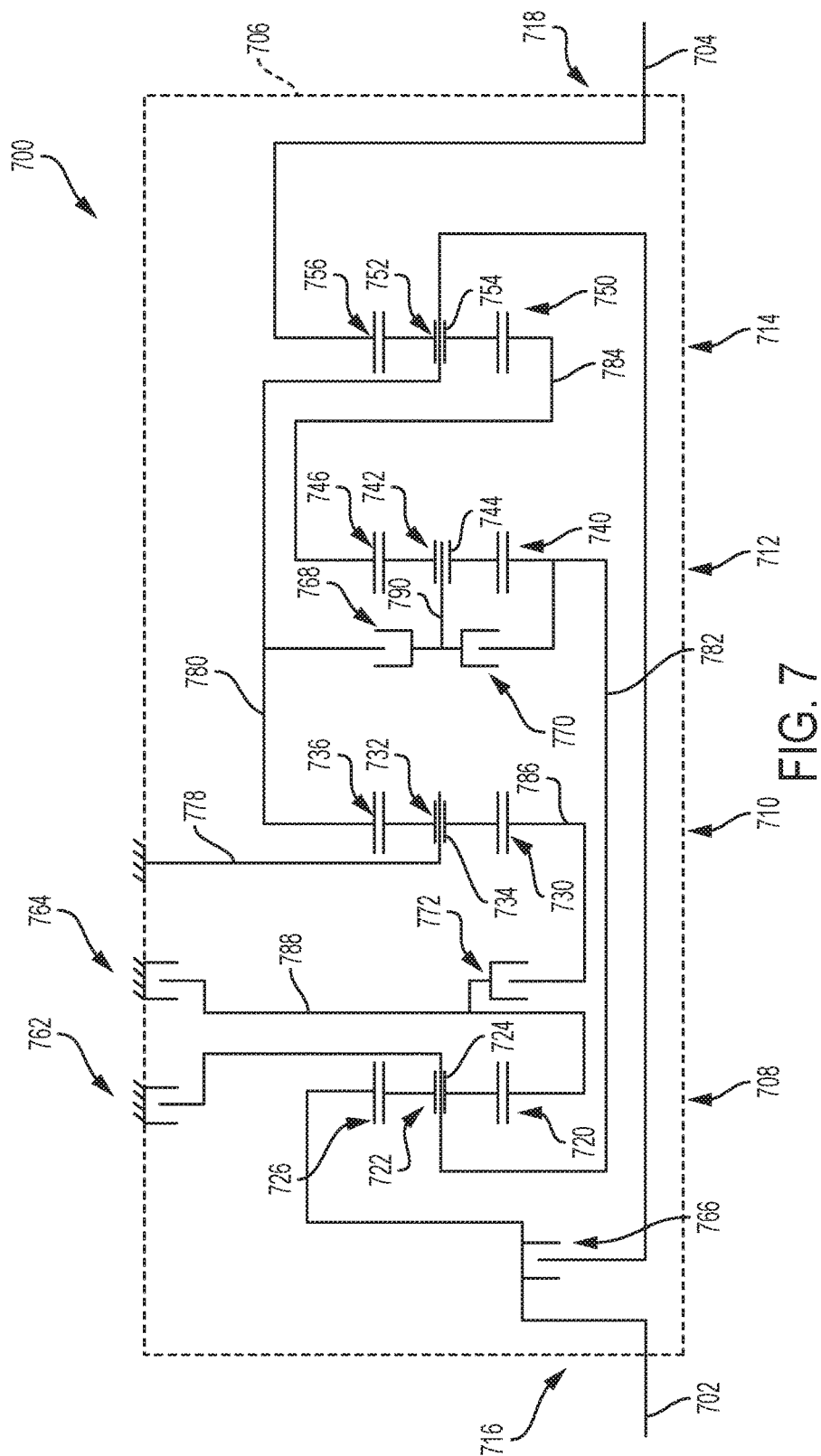
FIG. 7 is a diagrammatic view of another exemplary multi-speed transmission including four planetary gearsets and six selective couplers.

FIG. 7 is a diagrammatic representation of a multi-speed transmission 700. Multi-speed transmission 700 includes an input member 702 and an output member 704. Each of input member 702 and output member 704 is rotatable relative to at least one stationary member 706. An exemplary input member 702 is an input shaft or other suitable rotatable component. An exemplary output member 704 is an output shaft or other suitable rotatable component. An exemplary stationary member 706 is a housing of multi-speed transmission 700. The housing may include several components coupled together.

Multi-speed transmission 700 includes a plurality of planetary gearsets, illustratively a first planetary gearset 708, a second planetary gearset 710, a third planetary gearset 712, and a fourth planetary gearset 714. In one embodiment, additional planetary gearsets may be included. Further, although first planetary gearset 708, second planetary gearset 710, third planetary gearset 712, and fourth planetary gearset 714 are illustrated as simple planetary gearsets, it is contemplated that compound planetary gearsets may be included in some embodiments.

In one embodiment, multi-speed transmission 700 is arranged as illustrated in FIG. 7, with first planetary gearset 708 positioned between a first location or end 716 at which input member 702 enters stationary member 706 and second planetary gearset 710, second planetary gearset 710 is positioned between first planetary gearset 708 and third planetary gearset 712, third planetary gearset 712 is positioned between second planetary gearset 710 and fourth planetary gearset 714, and fourth planetary gearset 714 is positioned between third planetary gearset 712 and a second location or end 718 at which output member 704 exits stationary member 706. In alternative embodiments, first planetary gearset 708, second planetary gearset 710, third planetary gearset 712, and fourth planetary gearset 714 are arranged in any order relative to location 716 and location 718. In the illustrated embodiment of FIG. 7, each of first planetary gearset 708, second planetary gearset 710, third planetary gearset 712, and fourth planetary gearset 714 are axially aligned. In one example, input member 702 and output member 704 are also axially aligned with first planetary gearset 708, second planetary gearset 710, third planetary gearset 712, and fourth planetary gearset 714. In alternative embodiments, one or more of input member 702, output member 704, first planetary gearset 708, second planetary gearset 710, third planetary gearset 712, and fourth planetary gearset 714 are offset and not axially aligned with the remainder.

First planetary gearset 708 includes a sun gear 720, a planet carrier 722 supporting a plurality of planet gears 724, and a ring gear 726. Second planetary gearset 710 includes a sun gear 730, a planet carrier 732 supporting a plurality of planet gears 734, and a ring gear 736. Third planetary gearset 712 includes a sun gear 740, a planet carrier 742 supporting a plurality of planet gears 744, and a ring gear 746. Fourth planetary gearset 714 includes a sun gear 750, a planet carrier 752 supporting a plurality of planet gears 754, and a ring gear 756.

Multi-speed transmission 700 further includes a plurality of selective couplers, illustratively a first selective coupler 762, a second selective coupler 764, a third selective coupler 766, a fourth selective coupler 768, a fifth selective coupler 770, and a sixth selective coupler 772. In the illustrated embodiment, first selective coupler 762 and second selective coupler 764 are brakes and third selective coupler 766, fourth selective coupler 768, fifth selective coupler 770, and sixth selective coupler 772 are clutches. The axial locations of the clutches and brakes relative to the plurality of planetary gearsets may be altered from the illustrated axial locations.

Multi-speed transmission 700 includes several components that are illustratively shown as being fixedly coupled together. Input member 702 is fixedly coupled to ring gear 726 of first planetary gearset 708 and third selective coupler 766. Output member 704 is fixedly coupled to ring gear 756 of fourth planetary gearset 714. Ring gear 736 of second planetary gearset 710, planet carrier 752 of fourth planetary gearset 714, third selective coupler 766, and fourth selective coupler 768 are fixedly coupled together. Planet carrier 722 of first planetary gearset 708, sun gear 740 of third planetary gearset 712, first selective coupler 762, and fifth selective coupler 770 are fixedly coupled together. Ring gear 746 of third planetary gearset 712 and sun gear 750 of fourth planetary gearset 714 are fixedly coupled together. Sun gear 730 of second planetary gearset 710 and sixth selective coupler 772 are fixedly coupled together. Sun gear 720 of first planetary gearset 708, second selective coupler 764, and sixth selective coupler 772 are fixedly coupled together. Planet carrier 742 of third planetary gearset 712, fourth selective coupler 768, and fifth selective coupler 770 are fixedly coupled together. Planet carrier 732 of second planetary gearset 710 is fixedly coupled to at least one stationary member 706.

When fifth selective coupler 770 is engaged, planet carrier 742 of third planetary gearset 712 and sun gear 740 of third planetary gearset 712 are locked together. Hence, sun gear 740, planet carrier 742, and ring gear 746 of third planetary gearset 712 all rotate together as a single unit. The same effect may be realized by coupling any two of sun gear 740, planet carrier 742, and ring gear 746 together. In one example, fifth selective coupler 770 is fixedly coupled to ring gear 746 of third planetary gearset 712 and sun gear 740 of third planetary gearset 712. In this example, when fifth selective coupler 770 is engaged, ring gear 746 of third planetary gearset 712 and sun gear 740 of third planetary gearset 712 are locked together resulting in all of sun gear 740, planet carrier 742, and ring gear 746 of third planetary gearset 712 rotating together as a single unit. In another example, fifth selective coupler 770 is fixedly coupled to planet carrier 742 of third planetary gearset 712 and ring gear 746 of third planetary gearset 712. In this example, when fifth selective coupler 770 is engaged, planet carrier 742 of third planetary gearset 712 and ring gear 746 of third planetary gearset 712 are locked together resulting in all of sun gear 740, planet carrier 742, and ring gear 746 of third planetary gearset 712 rotating together as a single unit.

Multi-speed transmission 700 may be described as having nine interconnectors. Input member 702 is a first interconnector that both provides input torque to multi-speed transmission 700 and fixedly couples ring gear 726 of first planetary gearset 708 to third selective coupler 766. Output member 704 is a second interconnector that both provides output torque from multi-speed transmission 700 and is fixedly coupled to ring gear 756 of fourth planetary gearset 714. A third interconnector 780 fixedly couples ring gear 736 of second planetary gearset 710, planet carrier 752 of fourth planetary gearset 714, third selective coupler 766, and fourth selective coupler 768 together. A fourth interconnector 782 fixedly couples sun gear 740 of third planetary gearset 712, planet carrier 722 of first planetary gearset 708, first selective coupler 762, and fifth selective coupler 770 together. A fifth interconnector 784 fixedly couples ring gear 746 of third planetary gearset 712 and sun gear 750 of fourth planetary gearset 714 together. A sixth interconnector 786 fixedly couples sun gear 730 of second planetary gearset 710 and sixth selective coupler 772 together. A seventh interconnector 788 fixedly couples sun gear 720 of first planetary gearset 708, second selective coupler 764, and sixth selective coupler 772 together. An eighth interconnector 790 fixedly couples planet carrier 742 of third planetary gearset 712, fourth selective coupler 768, and fifth selective coupler 770 together. A ninth interconnector 778 fixedly couples planet carrier 732 of second planetary gearset 710 to at least one stationary member 706.

Multi-speed transmission 700 further includes several components that are illustratively shown as being selectively coupled together through selective couplers. First selective coupler 762, when engaged, fixedly couples planet carrier 722 of first planetary gearset 708 and sun gear 740 of third planetary gearset 712 to stationary member 706. When first selective coupler 762 is disengaged, planet carrier 722 of first planetary gearset 708 and sun gear 740 of third planetary gearset 712 may rotate relative to stationary member 706.

Second selective coupler 764, when engaged, fixedly couples sun gear 720 of first planetary gearset 708 to stationary member 706. When second selective coupler 764 is disengaged, sun gear 720 of first planetary gearset 708 may rotate relative to stationary member 706.

Third selective coupler 766, when engaged, fixedly couples ring gear 726 of first planetary gearset 708 to ring gear 736 of second planetary gearset 710 and planet carrier 752 of fourth planetary gearset 714. When third selective coupler 766 is disengaged, ring gear 726 of first planetary gearset 708 may rotate relative to ring gear 736 of second planetary gearset 710 and planet carrier 752 of fourth planetary gearset 714.

Fourth selective coupler 768, when engaged, fixedly couples ring gear 736 of second planetary gearset 710 and planet carrier 752 of fourth planetary gearset 714 to planet carrier 742 of third planetary gearset 712. When fourth selective coupler 768 is disengaged, ring gear 736 of second planetary gearset 710 and planet carrier 752 of fourth planetary gearset 714 may rotate relative to planet carrier 742 of third planetary gearset 712.

Fifth selective coupler 770, when engaged, fixedly couples planet carrier 722 of first planetary gearset 708 and sun gear 740 of third planetary gearset 712 to planet carrier 742 of third planetary gearset 712. When fifth selective coupler 770 is disengaged, planet carrier 722 of first planetary gearset 708 and sun gear 740 of third planetary gearset 712 may rotate relative to planet carrier 742 of third planetary gearset 712.

Sixth selective coupler 772, when engaged, fixedly couples sun gear 720 of first planetary gearset 708 to sun gear 730 of second planetary gearset 710. When sixth selective coupler 772 is disengaged, sun gear 720 of first planetary gearset 708 may rotate relative to sun gear 730 of second planetary gearset 710.

By engaging various combinations of first selective coupler 762, second selective coupler 764, third selective coupler 766, fourth selective coupler 768, fifth selective coupler 770, and sixth selective coupler 772, additional components of multi-speed transmission 700 may be fixedly coupled together.

The plurality of planetary gearsets and the plurality of selective couplers of multi-speed transmission 700 may be interconnected in various arrangements to provide torque from input member 702 to output member 704 in at least nine forward gear or speed ratios and one reverse gear or speed ratio. Referring to FIG. 8, an exemplary truth table 800 is shown that provides the state of each of first selective coupler 762, second selective coupler 764, third selective coupler 766, fourth selective coupler 768, fifth selective coupler 770, and sixth selective coupler 772 for ten different forward gear or speed ratios and one reverse gear or speed ratio. Each row corresponds to a given interconnection arrangement for transmission 700. The first column provides the gear range (reverse and $1^{st}$-$10^{th}$ forward gears). The second column provides the gear ratio between the input member 702 and the output member 704. The third column provides the gear step. The six rightmost columns illustrate which ones of the selective couplers 762-772 are engaged ("1" indicates engaged) and which ones of selective couplers 762-772 are disengaged ("(blank)" indicates disengaged). FIG. 8 is only one example of any number of truth tables possible for achieving at least nine forward ratios and one reverse ratio.

In the example of FIG. 8, the illustrated reverse ratio (Rev) is achieved by having second selective coupler 764, fifth selective coupler 770, and sixth selective coupler 772 in an engaged configuration and first selective coupler 762, third selective coupler 766, and fourth selective coupler 768 in a disengaged configuration.

In one embodiment, to place multi-speed transmission 700 in neutral (Neu), all of first selective coupler 762, second selective coupler 764, third selective coupler 766, fourth selective coupler 768, fifth selective coupler 770, and sixth selective coupler 772 are in the disengaged configuration. One or more of first selective coupler 762, second selective coupler 764, third selective coupler 766, fourth selective coupler 768, fifth selective coupler 770, and sixth selective coupler 772 may remain engaged in neutral (Neu) as long as the combination of first selective coupler 762, second selective coupler 764, third selective coupler 766, fourth selective coupler 768, fifth selective coupler 770, and sixth selective coupler 772 does not transmit torque from input member 702 to output member 704.

A first forward ratio (shown as 1st) in truth table 800 of FIG. 8 is achieved by having second selective coupler 764, fourth selective coupler 768, and sixth selective coupler 772 in an engaged configuration and first selective coupler 762, third selective coupler 766, and fifth selective coupler 770 in a disengaged configuration.

A second or subsequent forward ratio (shown as 2nd) in truth table 800 of FIG. 8 is achieved by having fourth selective coupler 768, fifth selective coupler 770, and sixth selective coupler 772 in an engaged configuration and first selective coupler 762, second selective coupler 764, and third selective coupler 766 in a disengaged configuration. Therefore, when transitioning between the first forward ratio and the second forward ratio, second selective coupler 764 is placed in the disengaged configuration and fifth selective coupler 770 is placed in the engaged configuration.

A third or subsequent forward ratio (shown as 3rd) in truth table 800 of FIG. 8 is achieved by having first selective coupler 762, fourth selective coupler 768, and sixth selective coupler 772 in an engaged configuration and second selective coupler 764, third selective coupler 766, and fifth selective coupler 770 in a disengaged configuration. Therefore, when transitioning between the second forward ratio and the third forward ratio, fifth selective coupler 770 is placed in the disengaged configuration and first selective coupler 762 is placed in the engaged configuration.

A fourth or subsequent forward ratio (shown as 4th) in truth table 800 of FIG. 8 is achieved by having third selective coupler 766, fourth selective coupler 768, and sixth selective coupler 772 in an engaged configuration and first selective coupler 762, second selective coupler 764, and fifth selective coupler 770 in a disengaged configuration. Therefore, when transitioning between the third forward ratio and the fourth forward ratio, first selective coupler 762 is placed in the disengaged configuration and third selective coupler 766 is placed in the engaged configuration.

A fifth or subsequent forward ratio (shown as 5th) in truth table 800 of FIG. 8 is achieved by having first selective coupler 762, third selective coupler 766, and fourth selective coupler 768 in an engaged configuration and second selective coupler 764, fifth selective coupler 770, and sixth selective coupler 772 in a disengaged configuration. Therefore, when transitioning between the fourth forward ratio and the fifth forward ratio, sixth selective coupler 772 is placed in the disengaged configuration and first selective coupler 762 is placed in the engaged configuration.

A sixth or subsequent forward ratio (shown as 6th) in truth table 800 of FIG. 8 is achieved by having second selective coupler 764, third selective coupler 766, and fourth selective coupler 768 in an engaged configuration and first selective coupler 762, fifth selective coupler 770, and sixth selective coupler 772 in a disengaged configuration. Therefore, when transitioning between the fifth forward ratio and the sixth forward ratio, first selective coupler 762 is placed in the disengaged configuration and second selective coupler 764 is placed in the engaged configuration.

A seventh or subsequent forward ratio (shown as 7th) in truth table 800 of FIG. 8 is achieved by having third selective coupler 766, fourth selective coupler 768, and fifth selective coupler 770 in an engaged configuration and first selective coupler 762, second selective coupler 764, and sixth selective coupler 772 in a disengaged configuration. Therefore, when transitioning between the sixth forward ratio and the seventh forward ratio, second selective coupler 764 is placed in the disengaged configuration and fifth selective coupler 770 is placed in the engaged configuration.

An eighth or subsequent forward ratio (shown as 8th) in truth table 800 of FIG. 8 is achieved by having second selective coupler 764, third selective coupler 766, and fifth selective coupler 770 in an engaged configuration and first selective coupler 762, fourth selective coupler 768, and sixth selective coupler 772 in a disengaged configuration. Therefore, when transitioning between the seventh forward ratio and the eighth forward ratio, fourth selective coupler 768 is placed in the disengaged configuration and second selective coupler 764 is placed in the engaged configuration.

A ninth or subsequent forward ratio (shown as 9th) in truth table 800 of FIG. 8 is achieved by having first selective coupler 762, third selective coupler 766, and fifth selective coupler 770 in an engaged configuration and second selective coupler 764, fourth selective coupler 768, and sixth selective coupler 772 in a disengaged configuration. Therefore, when transitioning between the eighth forward ratio and the ninth forward ratio, second selective coupler 764 is placed in the disengaged configuration and first selective coupler 762 is placed in the engaged configuration.

A tenth or subsequent forward ratio (shown as 10th) in truth table 800 of FIG. 8 is achieved by having third selective coupler 766, fifth selective coupler 770, and sixth selective coupler 772 in an engaged configuration and first selective coupler 762, second selective coupler 764, and fourth selective coupler 768 in a disengaged configuration. Therefore, when transitioning between the ninth forward ratio and the tenth forward ratio, first selective coupler 762 is placed in the disengaged configuration and sixth selective coupler 772 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

Figure 9:
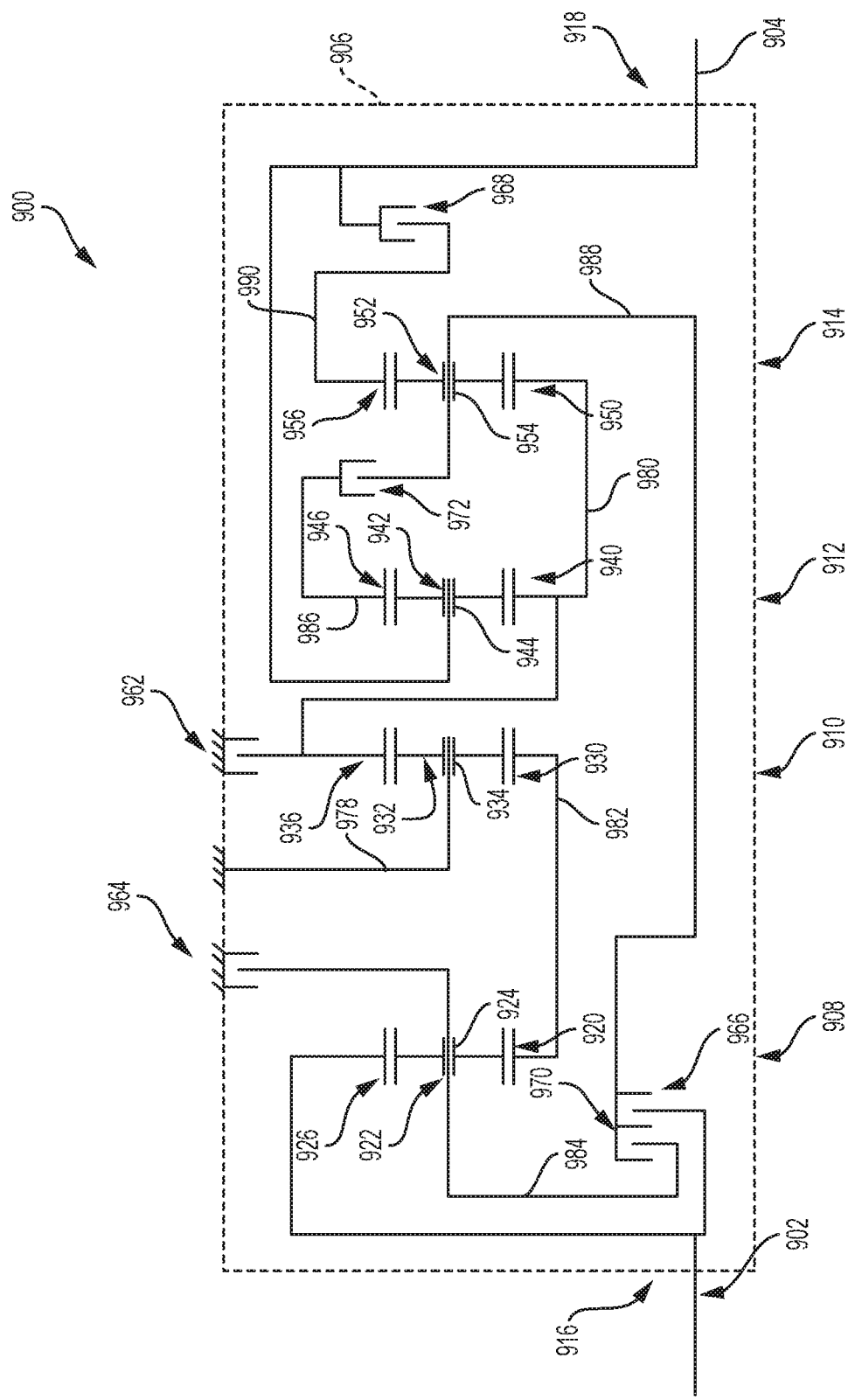
FIG. 9 is a diagrammatic view of an exemplary multi-speed transmission including four planetary gearsets and six selective couplers.

FIG. 9 is a diagrammatic representation of a multi-speed transmission 900. Multi-speed transmission 900 includes an input member 902 and an output member 904. Each of input member 902 and output member 904 is rotatable relative to at least one stationary member 906. An exemplary input member 902 is an input shaft or other suitable rotatable component. An exemplary output member 904 is an output shaft or other suitable rotatable component. An exemplary stationary member 906 is a housing of multi-speed transmission 900. The housing may include several components coupled together.

Multi-speed transmission 900 includes a plurality of planetary gearsets, illustratively a first planetary gearset 908, a second planetary gearset 910, a third planetary gearset 912, and a fourth planetary gearset 914. In one embodiment, additional planetary gearsets may be included. Further, although first planetary gearset 908, second planetary gearset 910, third planetary gearset 912, and fourth planetary gearset 914 are illustrated as simple planetary gearsets, it is contemplated that compound planetary gearsets may be included in some embodiments.

In one embodiment, multi-speed transmission 900 is arranged as illustrated in FIG. 9, with first planetary gearset 908 positioned between a first location or end 916 at which input member 902 enters stationary member 906 and second planetary gearset 910, second planetary gearset 910 is positioned between first planetary gearset 908 and third planetary gearset 912, third planetary gearset 912 is positioned between second planetary gearset 910 and fourth planetary gearset 914, and fourth planetary gearset 914 is positioned between third planetary gearset 912 and a second location or end 918 at which output member 904 exits stationary member 906. In alternative embodiments, first planetary gearset 908, second planetary gearset 910, third planetary gearset 912, and fourth planetary gearset 914 are arranged in any order relative to location 916 and location 918. In the illustrated embodiment of FIG. 9, each of first planetary gearset 908, second planetary gearset 910, third planetary gearset 912, and fourth planetary gearset 914 are axially aligned. In one example, input member 902 and output member 904 are also axially aligned with first planetary gearset 908, second planetary gearset 910, third planetary gearset 912, and fourth planetary gearset 914. In alternative embodiments, one or more of input member 902, output member 904, first planetary gearset 908, second planetary gearset 910, third planetary gearset 912, and fourth planetary gearset 914 are offset and not axially aligned with the remainder.

First planetary gearset 908 includes a sun gear 920, a planet carrier 922 supporting a plurality of planet gears 924, and a ring gear 926. Second planetary gearset 910 includes a sun gear 930, a planet carrier 932 supporting a plurality of planet gears 934, and a ring gear 936. Third planetary gearset 912 includes a sun gear 940, a planet carrier 942 supporting a plurality of planet gears 944, and a ring gear 946. Fourth planetary gearset 914 includes a sun gear 950, a planet carrier 952 supporting a plurality of planet gears 954, and a ring gear 956.

Multi-speed transmission 900 further includes a plurality of selective couplers, illustratively a first selective coupler 962, a second selective coupler 964, a third selective coupler 966, a fourth selective coupler 968, a fifth selective coupler 970, and a sixth selective coupler 972. In the illustrated embodiment, first selective coupler 962 and second selective coupler 964 are brakes and third selective coupler 966, fourth selective coupler 968, fifth selective coupler 970, and sixth selective coupler 972 are clutches. The axial locations of the clutches and brakes relative to the plurality of planetary gearsets may be altered from the illustrated axial locations.

Multi-speed transmission 900 includes several components that are illustratively shown as being fixedly coupled together. Input member 902 is fixedly coupled to ring gear 926 of first planetary gearset 908 and third selective coupler 966. Output member 904 is fixedly coupled to planet carrier 942 of third planetary gearset 912 and fourth selective coupler 968. Ring gear 936 of second planetary gearset 910, sun gear 940 of third planetary gearset 912, sun gear 950 of fourth planetary gearset 914, and first selective coupler 962 are fixedly coupled together. Sun gear 920 of first planetary gearset 908 and sun gear 930 of second planetary gearset 910 are fixedly coupled together. Planet carrier 922 of first planetary gearset 908, second selective coupler 964, and fifth selective coupler 970 are fixedly coupled together. Ring gear 946 of third planetary gearset 912 and sixth selective coupler 972 are fixedly coupled together. Planet carrier 952 of fourth planetary gearset 914, third selective coupler 966, fifth selective coupler 970, and sixth selective coupler 972 are fixedly coupled together. Ring gear 956 of fourth planetary gearset 914 and fourth selective coupler 968 are fixedly coupled together. Planet carrier 932 of second planetary gearset 910 is fixedly coupled to at least one stationary member 906.

Multi-speed transmission 900 may be described as having nine interconnectors. Input member 902 is a first interconnector that both provides input torque to multi-speed transmission 900 and fixedly couples ring gear 926 of first planetary gearset 908 to third selective coupler 966. Output member 904 is a second interconnector that both provides output torque from multi-speed transmission 900 and fixedly couples planet carrier 942 of third planetary gearset 912 to fourth selective coupler 968. A third interconnector 980 fixedly couples ring gear 936 of second planetary gearset 910, sun gear 940 of third planetary gearset 912, sun gear 950 of fourth planetary gearset 914, and first selective coupler 962 together. A fourth interconnector 982 fixedly couples sun gear 920 of first planetary gearset 908 and sun gear 930 of second planetary gearset 910 together. A fifth interconnector 984 fixedly couples planet carrier 922 of first planetary gearset 908, second selective coupler 964, and fifth selective coupler 970 together. A sixth interconnector 986 fixedly couples ring gear 946 of third planetary gearset 912 to sixth selective coupler 972. A seventh interconnector 988 fixedly couples planet carrier 952 of fourth planetary gearset 914, third selective coupler 966, fifth selective coupler 970, and sixth selective coupler 972 together. An eighth interconnector 990 fixedly couples ring gear 956 of fourth planetary gearset 914 and fourth selective coupler 968 together. A ninth interconnector 978 fixedly couples planet carrier 932 of second planetary gearset 910 to at least one stationary member 906.

Multi-speed transmission 900 further includes several components that are illustratively shown as being selectively coupled together through selective couplers. First selective coupler 962, when engaged, fixedly couples ring gear 936 of second planetary gearset 910, sun gear 940 of third planetary gearset 912, and sun gear 950 of fourth planetary gearset 914 to stationary member 906. When first selective coupler 962 is disengaged, ring gear 936 of second planetary gearset 910, sun gear 940 of third planetary gearset 912, and sun gear 950 of fourth planetary gearset 914 may rotate relative to stationary member 906.

Second selective coupler 964, when engaged, fixedly couples planet carrier 922 of first planetary gearset 908 to stationary member 906. When second selective coupler 964 is disengaged, planet carrier 922 of first planetary gearset 908 may rotate relative to stationary member 906.

Third selective coupler 966, when engaged, fixedly couples ring gear 926 of first planetary gearset 908 to planet carrier 952 of fourth planetary gearset 914. When third selective coupler 966 is disengaged, ring gear 926 of first planetary gearset 908 may rotate relative to planet carrier 952 of fourth planetary gearset 914.

Fourth selective coupler 968, when engaged, fixedly couples ring gear 956 of fourth planetary gearset 914 to planet carrier 942 of third planetary gearset 912. When fourth selective coupler 968 is disengaged, ring gear 956 of fourth planetary gearset 914 may rotate relative to planet carrier 942 of third planetary gearset 912.

Fifth selective coupler 970, when engaged, fixedly couples planet carrier 922 of first planetary gearset 908 to planet carrier 952 of fourth planetary gearset 914. When fifth selective coupler 970 is disengaged, planet carrier 922 of first planetary gearset 908 may rotate relative to planet carrier 952 of fourth planetary gearset 914.

Sixth selective coupler 972, when engaged, fixedly couples ring gear 946 of third planetary gearset 912 to planet carrier 952 of fourth planetary gearset 914. When sixth selective coupler 972 is disengaged, ring gear 946 of third planetary gearset 912 may rotate relative to planet carrier 952 of fourth planetary gearset 914.

By engaging various combinations of first selective coupler 962, second selective coupler 964, third selective coupler 966, fourth selective coupler 968, fifth selective coupler 970, and sixth selective coupler 972, additional components of multi-speed transmission 900 may be fixedly coupled together.

The plurality of planetary gearsets and the plurality of selective couplers of multi-speed transmission 900 may be interconnected in various arrangements to provide torque from input member 902 to output member 904 in at least nine forward gear or speed ratios and one reverse gear or speed ratio. Referring to FIG. 10, an exemplary truth table 1000 is shown that provides the state of each of first selective coupler 962, second selective coupler 964, third selective coupler 966, fourth selective coupler 968, fifth selective coupler 970, and sixth selective coupler 972 for ten different forward gear or speed ratios and one reverse gear or speed ratio. Each row corresponds to a given interconnection arrangement for transmission 900. The first column provides the gear range (reverse and $1^{st}$-$10^{th}$ forward gears). The second column provides the gear ratio between the input member 902 and the output member 904. The third column provides the gear step. The six rightmost columns illustrate which ones of the selective couplers 962-972 are engaged ("1" indicates engaged) and which ones of selective couplers 962-972 are disengaged ("(blank)" indicates disengaged). FIG. 10 is only one example of any number of truth tables possible for achieving at least nine forward ratios and one reverse ratio.

In the example of FIG. 10, the illustrated reverse ratio (Rev) is achieved by having second selective coupler 964, fourth selective coupler 968, and fifth selective coupler 970 in an engaged configuration and first selective coupler 962, third selective coupler 966, and sixth selective coupler 972 in a disengaged configuration.

In one embodiment, to place multi-speed transmission 900 in neutral (Neu), all of first selective coupler 962, second selective coupler 964, third selective coupler 966, fourth selective coupler 968, fifth selective coupler 970, and sixth selective coupler 972 are in the disengaged configuration. One or more of first selective coupler 962, second selective coupler 964, third selective coupler 966, fourth selective coupler 968, fifth selective coupler 970, and sixth selective coupler 972 may remain engaged in neutral (Neu) as long as the combination of first selective coupler 962, second selective coupler 964, third selective coupler 966, fourth selective coupler 968, fifth selective coupler 970, and sixth selective coupler 972 does not transmit torque from input member 902 to output member 904.

A first forward ratio (shown as 1st) in truth table 1000 of FIG. 10 is achieved by having second selective coupler 964, fifth selective coupler 970, and sixth selective coupler 972 in an engaged configuration and first selective coupler 962, third selective coupler 966, and fourth selective coupler 968 in a disengaged configuration.

A second or subsequent forward ratio (shown as 2nd) in truth table 1000 of FIG. 10 is achieved by having fourth selective coupler 968, fifth selective coupler 970, and sixth selective coupler 972 in an engaged configuration and first selective coupler 962, second selective coupler 964, and third selective coupler 966 in a disengaged configuration. Therefore, when transitioning between the first forward ratio and the second forward ratio, second selective coupler 964 is placed in the disengaged configuration and fourth selective coupler 968 is placed in the engaged configuration.

A third or subsequent forward ratio (shown as 3rd) in truth table 1000 of FIG. 10 is achieved by having first selective coupler 962, fifth selective coupler 970, and sixth selective coupler 972 in an engaged configuration and second selective coupler 964, third selective coupler 966, and fourth selective coupler 968 in a disengaged configuration. Therefore, when transitioning between the second forward ratio and the third forward ratio, fourth selective coupler 968 is placed in the disengaged configuration and first selective coupler 962 is placed in the engaged configuration.

A fourth or subsequent forward ratio (shown as 4th) in truth table 1000 of FIG. 10 is achieved by having third selective coupler 966, fifth selective coupler 970, and sixth selective coupler 972 in an engaged configuration and first selective coupler 962, second selective coupler 964, and fourth selective coupler 968 in a disengaged configuration. Therefore, when transitioning between the third forward ratio and the fourth forward ratio, first selective coupler 962 is placed in the disengaged configuration and third selective coupler 966 is placed in the engaged configuration.

A fifth or subsequent forward ratio (shown as 5th) in truth table 1000 of FIG. 10 is achieved by having first selective coupler 962, third selective coupler 966, and sixth selective coupler 972 in an engaged configuration and second selective coupler 964, fourth selective coupler 968, and fifth selective coupler 970 in a disengaged configuration. Therefore, when transitioning between the fourth forward ratio and the fifth forward ratio, fifth selective coupler 970 is placed in the disengaged configuration and first selective coupler 962 is placed in the engaged configuration.

A sixth or subsequent forward ratio (shown as 6th) in truth table 1000 of FIG. 10 is achieved by having second selective coupler 964, third selective coupler 966, and sixth selective coupler 972 in an engaged configuration and first selective coupler 962, fourth selective coupler 968, and fifth selective coupler 970 in a disengaged configuration. Therefore, when transitioning between the fifth forward ratio and the sixth forward ratio, first selective coupler 962 is placed in the disengaged configuration and second selective coupler 964 is placed in the engaged configuration.

A seventh or subsequent forward ratio (shown as 7th) in truth table 1000 of FIG. 10 is achieved by having third selective coupler 966, fourth selective coupler 968, and sixth selective coupler 972 in an engaged configuration and first selective coupler 962, second selective coupler 964, and fifth selective coupler 970 in a disengaged configuration. Therefore, when transitioning between the sixth forward ratio and the seventh forward ratio, second selective coupler 964 is placed in the disengaged configuration and fourth selective coupler 968 is placed in the engaged configuration.

An eighth or subsequent forward ratio (shown as 8th) in truth table 1000 of FIG. 10 is achieved by having second selective coupler 964, third selective coupler 966, and fourth selective coupler 968 in an engaged configuration and first selective coupler 962, fifth selective coupler 970, and sixth selective coupler 972 in a disengaged configuration. Therefore, when transitioning between the seventh forward ratio and the eighth forward ratio, sixth selective coupler 972 is placed in the disengaged configuration and second selective coupler 964 is placed in the engaged configuration.

A ninth or subsequent forward ratio (shown as 9th) in truth table 1000 of FIG. 10 is achieved by having first selective coupler 962, third selective coupler 966, and fourth selective coupler 968 in an engaged configuration and second selective coupler 964, fifth selective coupler 970, and sixth selective coupler 972 in a disengaged configuration. Therefore, when transitioning between the eighth forward ratio and the ninth forward ratio, second selective coupler 964 is placed in the disengaged configuration and first selective coupler 962 is placed in the engaged configuration.

A tenth or subsequent forward ratio (shown as 10th) in truth table 1000 of FIG. 10 is achieved by having third selective coupler 966, fourth selective coupler 968, and fifth selective coupler 970 in an engaged configuration and first selective coupler 962, second selective coupler 964, and sixth selective coupler 972 in a disengaged configuration. Therefore, when transitioning between the ninth forward ratio and the tenth forward ratio, first selective coupler 962 is placed in the disengaged configuration and fifth selective coupler 970 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

Figure 11:
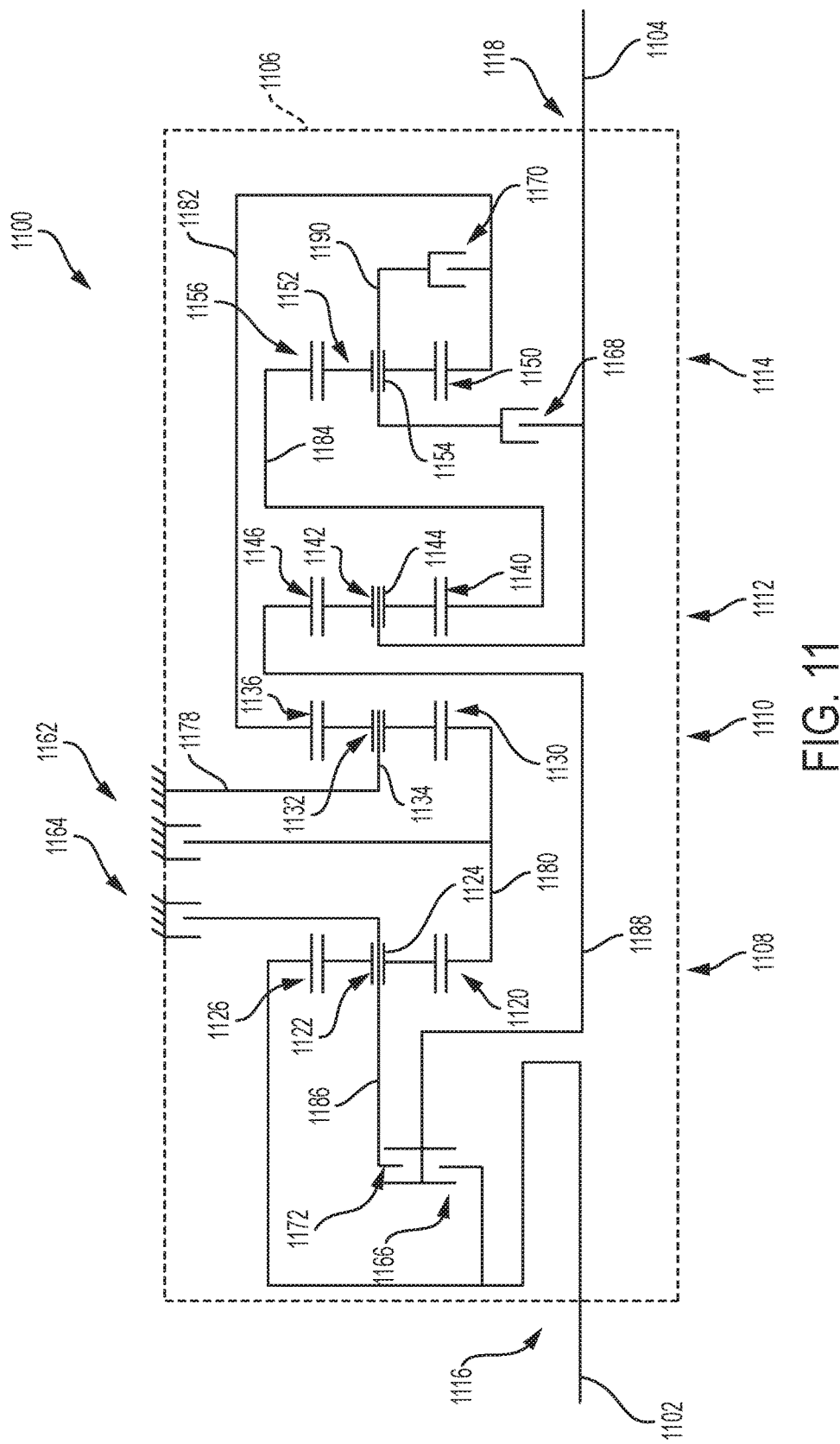
FIG. 11 is a diagrammatic view of another exemplary multi-speed transmission including four planetary gearsets and six selective couplers.

FIG. 11 is a diagrammatic representation of a multi-speed transmission 1100. Multi-speed transmission 1100 includes an input member 1102 and an output member 1104. Each of input member 1102 and output member 1104 is rotatable relative to at least one stationary member 1106. An exemplary input member 1102 is an input shaft or other suitable rotatable component. An exemplary output member 1104 is an output shaft or other suitable rotatable component. An exemplary stationary member 1106 is a housing of multi-speed transmission 1100. The housing may include several components coupled together.

Multi-speed transmission 1100 includes a plurality of planetary gearsets, illustratively a first planetary gearset 1108, a second planetary gearset 1110, a third planetary gearset 1112, and a fourth planetary gearset 1114. In one embodiment, additional planetary gearsets may be included. Further, although first planetary gearset 1108, second planetary gearset 1110, third planetary gearset 1112, and fourth planetary gearset 1114 are illustrated as simple planetary gearsets, it is contemplated that compound planetary gearsets may be included in some embodiments.

In one embodiment, multi-speed transmission 1100 is arranged as illustrated in FIG. 11, with first planetary gearset 1108 positioned between a first location or end 1116 at which input member 1102 enters stationary member 1106 and second planetary gearset 1110, second planetary gearset 1110 is positioned between first planetary gearset 1108 and third planetary gearset 1112, third planetary gearset 1112 is positioned between second planetary gearset 1110 and fourth planetary gearset 1114, and fourth planetary gearset 1114 is positioned between third planetary gearset 1112 and a second location or end 1118 at which output member 1104 exits stationary member 1106. In alternative embodiments, first planetary gearset 1108, second planetary gearset 1110, third planetary gearset 1112, and fourth planetary gearset 1114 are arranged in any order relative to location 1116 and location 1118. In the illustrated embodiment of FIG. 11, each of first planetary gearset 1108, second planetary gearset 1110, third planetary gearset 1112, and fourth planetary gearset 1114 are axially aligned. In one example, input member 1102 and output member 1104 are also axially aligned with first planetary gearset 1108, second planetary gearset 1110, third planetary gearset 1112, and fourth planetary gearset 1114. In alternative embodiments, one or more of input member 1102, output member 1104, first planetary gearset 1108, second planetary gearset 1110, third planetary gearset 1112, and fourth planetary gearset 1114 are offset and not axially aligned with the remainder.

First planetary gearset 1108 includes a sun gear 1120, a planet carrier 1122 supporting a plurality of planet gears 1124, and a ring gear 1126. Second planetary gearset 1110 includes a sun gear 1130, a planet carrier 1132 supporting a plurality of planet gears 1134, and a ring gear 1136. Third planetary gearset 1112 includes a sun gear 1140, a planet carrier 1142 supporting a plurality of planet gears 1144, and a ring gear 1146. Fourth planetary gearset 1114 includes a sun gear 1150, a planet carrier 1152 supporting a plurality of planet gears 1154, and a ring gear 1156.

Multi-speed transmission 1100 further includes a plurality of selective couplers, illustratively a first selective coupler 1162, a second selective coupler 1164, a third selective coupler 1166, a fourth selective coupler 1168, a fifth selective coupler 1170, and a sixth selective coupler 1172. In the illustrated embodiment, first selective coupler 1162 and second selective coupler 1164 are brakes and third selective coupler 1166, fourth selective coupler 1168, fifth selective coupler 1170, and sixth selective coupler 1172 are clutches. The axial locations of the clutches and brakes relative to the plurality of planetary gearsets may be altered from the illustrated axial locations.

Multi-speed transmission 1100 includes several components that are illustratively shown as being fixedly coupled together. Input member 1102 is fixedly coupled to ring gear 1126 of first planetary gearset 1108 and third selective coupler 1166. Output member 1104 is fixedly coupled to planet carrier 1142 of third planetary gearset 1112 and fourth selective coupler 1168. Sun gear 1120 of first planetary gearset 1108, sun gear 1130 of second planetary gearset 1110, and first selective coupler 1162 are fixedly coupled together. Ring gear 1136 of second planetary gearset 1110, sun gear 1150 of fourth planetary gearset 1114, and fifth selective coupler 1170 are fixedly coupled together. Sun gear 1140 of third planetary gearset 1112 is fixedly coupled to ring gear 1156 of fourth planetary gearset 1114. Planet carrier 1122 of first planetary gearset 1108, second selective coupler 1164, and sixth selective coupler 1172 are fixedly coupled together. Ring gear 1146 of third planetary gearset 1112, third selective coupler 1166, and sixth selective coupler 1172 are fixedly coupled together. Planet carrier 1152 of fourth planetary gearset 1114, fourth selective coupler 1168, and fifth selective coupler 1170 are fixedly coupled together. Planet carrier 1132 of second planetary gearset 1110 is fixedly coupled to at least one stationary member 1106.

When fifth selective coupler 1170 is engaged, planet carrier 1152 of fourth planetary gearset 1114 and sun gear 1150 of fourth planetary gearset 1114 are locked together. Hence, sun gear 1150, planet carrier 1152, and ring gear 1156 of fourth planetary gearset 1114 all rotate together as a single unit. The same effect may be realized by coupling any two of sun gear 1150, planet carrier 1152, and ring gear 1156 together. In one example, fifth selective coupler 1170 is fixedly coupled to ring gear 1156 of fourth planetary gearset 1114 and sun gear 1150 of fourth planetary gearset 1114. In this example, when fifth selective coupler 1170 is engaged, ring gear 1156 of fourth planetary gearset 1114 and sun gear 1150 of fourth planetary gearset 1114 are locked together resulting in all of sun gear 1150, planet carrier 1152, and ring gear 1156 of fourth planetary gearset 1114 rotating together as a single unit. In another example, fifth selective coupler 1170 is fixedly coupled to planet carrier 1152 of fourth planetary gearset 1114 and ring gear 1146 of fourth planetary gearset 1114. In this example, when fifth selective coupler 1170 is engaged, planet carrier 1152 of fourth planetary gearset 1114 and ring gear 1146 of fourth planetary gearset 1114 are locked together resulting in all of sun gear 1150, planet carrier 1152, and ring gear 1156 of fourth planetary gearset 1114 rotating together as a single unit.

Multi-speed transmission 1100 may be described as having nine interconnectors. Input member 1102 is a first interconnector that both provides input torque to multi-speed transmission 1100 and fixedly couples ring gear 1126 of first planetary gearset 1108 to third selective coupler 1166. Output member 1104 is a second interconnector that both provides output torque from multi-speed transmission 1100 and fixedly couples planet carrier 1142 of third planetary gearset 1112 to fourth selective coupler 1168. A third interconnector 1180 fixedly couples sun gear 1120 of first planetary gearset 1108, sun gear 1130 of second planetary gearset 1110, and first selective coupler 1162 together. A fourth interconnector 1182 fixedly couples ring gear 1136 of second planetary gearset 1110, sun gear 1150 of fourth planetary gearset 1114, and fifth selective coupler 1170 together. A fifth interconnector 1184 fixedly couples sun gear 1140 of third planetary gearset 1112 and ring gear 1156 of fourth planetary gearset 1114 together. A sixth interconnector 1186 fixedly couples planet carrier 1122 of first planetary gearset 1108, second selective coupler 1164, and sixth selective coupler 1172 together. A seventh interconnector 1188 fixedly couples ring gear 1146 of third planetary gearset 1112, third selective coupler 1166, and sixth selective coupler 1172 together. An eighth interconnector 1190 fixedly couples planet carrier 1152 of fourth planetary gearset 1114, fourth selective coupler 1168, and fifth selective coupler 1170 together. A ninth interconnector 1178 fixedly couples planet carrier 1132 of second planetary gearset 1110 to at least one stationary member 1106.

Multi-speed transmission 1100 further includes several components that are illustratively shown as being selectively coupled together through selective couplers. First selective coupler 1162, when engaged, fixedly couples sun gear 1120 of first planetary gearset 1108 and sun gear 1130 of second planetary gearset 1110 to stationary member 1106. When first selective coupler 1162 is disengaged, sun gear 1120 of first planetary gearset 1108 and sun gear 1130 of second planetary gearset 1110 may rotate relative to stationary member 1106.

Second selective coupler 1164, when engaged, fixedly couples planet carrier 1122 of first planetary gearset 1108 to stationary member 1106. When second selective coupler 1164 is disengaged, planet carrier 1122 of first planetary gearset 1108 may rotate relative to stationary member 1106.

Third selective coupler 1166, when engaged, fixedly couples ring gear 1126 of first planetary gearset 1108 to ring gear 1146 of third planetary gearset 1112. When third selective coupler 1166 is disengaged, ring gear 1126 of first planetary gearset 1108 may rotate relative to ring gear 1146 of third planetary gearset 1112.

Fourth selective coupler 1168, when engaged, fixedly couples planet carrier 1142 of third planetary gearset 1112 to planet carrier 1152 of fourth planetary gearset 1114. When fourth selective coupler 1168 is disengaged, planet carrier 1142 of third planetary gearset 1112 may rotate relative to planet carrier 1152 of fourth planetary gearset 1114.

Fifth selective coupler 1170, when engaged, fixedly couples planet carrier 1152 of fourth planetary gearset 1114 to ring gear 1136 of second planetary gearset 1110 and sun gear 1150 of fourth planetary gearset 1114. When fifth selective coupler 1170 is disengaged, planet carrier 1152 of fourth planetary gearset 1114 may rotate relative to ring gear 1136 of second planetary gearset 1110 and sun gear 1150 of fourth planetary gearset 1114.

Sixth selective coupler 1172, when engaged, fixedly couples planet carrier 1122 of first planetary gearset 1108 to ring gear 1146 of third planetary gearset 1112. When sixth selective coupler 1172 is disengaged, planet carrier 1122 of first planetary gearset 1108 may rotate relative to ring gear 1146 of third planetary gearset 1112.

By engaging various combinations of first selective coupler 1162, second selective coupler 1164, third selective coupler 1166, fourth selective coupler 1168, fifth selective coupler 1170, and sixth selective coupler 1172, additional components of multi-speed transmission 1100 may be fixedly coupled together.

The plurality of planetary gearsets and the plurality of selective couplers of multi-speed transmission 1100 may be interconnected in various arrangements to provide torque from input member 1102 to output member 1104 in at least nine forward gear or speed ratios and one reverse gear or speed ratio. Referring to FIG. 12, an exemplary truth table 1200 is shown that provides the state of each of first selective coupler 1162, second selective coupler 1164, third selective coupler 1166, fourth selective coupler 1168, fifth selective coupler 1170, and sixth selective coupler 1172 for ten different forward gear or speed ratios and one reverse gear or speed ratio. Each row corresponds to a given interconnection arrangement for transmission 1100. The first column provides the gear range (reverse and $1^{st}$-$10^{th}$ forward gears). The second column provides the gear ratio between the input member 1102 and the output member 1104. The third column provides the gear step. The six rightmost columns illustrate which ones of the selective couplers 1162-1172 are engaged ("1" indicates engaged) and which ones of selective couplers 1162-1172 are disengaged ("(blank)" indicates disengaged). FIG. 12 is only one example of any number of truth tables possible for achieving at least nine forward ratios and one reverse ratio.

In the example of FIG. 12, the illustrated reverse ratio (Rev) is achieved by having second selective coupler 1164, fourth selective coupler 1168, and sixth selective coupler 1172 in an engaged configuration and first selective coupler 1162, third selective coupler 1166, and fifth selective coupler 1170 in a disengaged configuration.

In one embodiment, to place multi-speed transmission 1100 in neutral (Neu), all of first selective coupler 1162, second selective coupler 1164, third selective coupler 1166, fourth selective coupler 1168, fifth selective coupler 1170, and sixth selective coupler 1172 are in the disengaged configuration. One or more of first selective coupler 1162, second selective coupler 1164, third selective coupler 1166, fourth selective coupler 1168, fifth selective coupler 1170, and sixth selective coupler 1172 may remain engaged in neutral (Neu) as long as the combination of first selective coupler 1162, second selective coupler 1164, third selective coupler 1166, fourth selective coupler 1168, fifth selective coupler 1170, and sixth selective coupler 1172 does not transmit torque from input member 1102 to output member 1104.

A first forward ratio (shown as 1st) in truth table 1200 of FIG. 12 is achieved by having second selective coupler 1164, fifth selective coupler 1170, and sixth selective coupler 1172 in an engaged configuration and first selective coupler 1162, third selective coupler 1166, and fourth selective coupler 1168 in a disengaged configuration.

A second or subsequent forward ratio (shown as 2nd) in truth table 1200 of FIG. 12 is achieved by having fourth selective coupler 1168, fifth selective coupler 1170, and sixth selective coupler 1172 in an engaged configuration and first selective coupler 1162, second selective coupler 1164, and third selective coupler 1166 in a disengaged configuration. Therefore, when transitioning between the first forward ratio and the second forward ratio, second selective coupler 1164 is placed in the disengaged configuration and fourth selective coupler 1168 is placed in the engaged configuration.

A third or subsequent forward ratio (shown as 3rd) in truth table 1200 of FIG. 12 is achieved by having first selective coupler 1162, fifth selective coupler 1170, and sixth selective coupler 1172 in an engaged configuration and second selective coupler 1164, third selective coupler 1166, and fourth selective coupler 1168 in a disengaged configuration. Therefore, when transitioning between the second forward ratio and the third forward ratio, fourth selective coupler 1168 is placed in the disengaged configuration and first selective coupler 1162 is placed in the engaged configuration.

A fourth or subsequent forward ratio (shown as 4th) in truth table 1200 of FIG. 12 is achieved by having third selective coupler 1166, fifth selective coupler 1170, and sixth selective coupler 1172 in an engaged configuration and first selective coupler 1162, second selective coupler 1164, and fourth selective coupler 1168 in a disengaged configuration. Therefore, when transitioning between the third forward ratio and the fourth forward ratio, first selective coupler 1162 is placed in the disengaged configuration and third selective coupler 1166 is placed in the engaged configuration.

A fifth or subsequent forward ratio (shown as 5th) in truth table 1200 of FIG. 12 is achieved by having first selective coupler 1162, third selective coupler 1166, and fifth selective coupler 1170 in an engaged configuration and second selective coupler 1164, fourth selective coupler 1168, and sixth selective coupler 1172 in a disengaged configuration. Therefore, when transitioning between the fourth forward ratio and the fifth forward ratio, sixth selective coupler 1172 is placed in the disengaged configuration and first selective coupler 1162 is placed in the engaged configuration.

A sixth or subsequent forward ratio (shown as 6th) in truth table 1200 of FIG. 12 is achieved by having second selective coupler 1164, and third selective coupler 1166, and fifth selective coupler 1170 in an engaged configuration and first selective coupler 1162, fourth selective coupler 1168, and sixth selective coupler 1172 in a disengaged configuration. Therefore, when transitioning between the fifth forward ratio and the sixth forward ratio, first selective coupler 1162 is placed in the disengaged configuration and second selective coupler 1164 is placed in the engaged configuration.

A seventh or subsequent forward ratio (shown as 7th) in truth table 1200 of FIG. 12 is achieved by having third selective coupler 1166, fourth selective coupler 1168, and fifth selective coupler 1170 in an engaged configuration and first selective coupler 1162, second selective coupler 1164, and sixth selective coupler 1172 in a disengaged configuration. Therefore, when transitioning between the sixth forward ratio and the seventh forward ratio, second selective coupler 1164 is placed in the disengaged configuration and fourth selective coupler 1168 is placed in the engaged configuration.

An eighth or subsequent forward ratio (shown as 8th) in truth table 1200 of FIG. 12 is achieved by having second selective coupler 1164, third selective coupler 1166, and fourth selective coupler 1168 in an engaged configuration and first selective coupler 1162, fifth selective coupler 1170, and sixth selective coupler 1172 in a disengaged configuration. Therefore, when transitioning between the seventh forward ratio and the eighth forward ratio, fifth selective coupler 1170 is placed in the disengaged configuration and second selective coupler 1164 is placed in the engaged configuration.

A ninth or subsequent forward ratio (shown as 9th) in truth table 1200 of FIG. 12 is achieved by having first selective coupler 1162, third selective coupler 1166, and fourth selective coupler 1168 in an engaged configuration and second selective coupler 1164, fifth selective coupler 1170, and sixth selective coupler 1172 in a disengaged configuration. Therefore, when transitioning between the eighth forward ratio and the ninth forward ratio, second selective coupler 1164 is placed in the disengaged configuration and first selective coupler 1162 is placed in the engaged configuration.

A tenth or subsequent forward ratio (shown as 10th) in truth table 1200 of FIG. 12 is achieved by having third selective coupler 1166, fourth selective coupler 1168, and sixth selective coupler 1172 in an engaged configuration and first selective coupler 1162, second selective coupler 1164, and fifth selective coupler 1170 in a disengaged configuration. Therefore, when transitioning between the ninth forward ratio and the tenth forward ratio, first selective coupler 1162 is placed in the disengaged configuration and sixth selective coupler 1172 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

In the illustrated embodiments, various combinations of four of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has four of the available selective couplers engaged, it is contemplated that less than four and more than four selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
at least one stationary member;
an input member rotatable relative to the at least one stationary member;
a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, wherein the second gearset component of the second planetary gearset is fixedly coupled to the at least one stationary member;
an output member operatively coupled to the input member through the plurality of planetary gearsets and rotatable relative to the at least one stationary member, the output member is fixedly coupled to the third gearset component of the fourth planetary gearset;
a first interconnector which fixedly couples the third gearset component of the second planetary gearset, the second gearset component of the third planetary gearset, and the second gearset component of the fourth planetary gearset together;
a second interconnector which fixedly couples the second gearset component of the first planetary gearset to the first gearset component of the third planetary gearset; and
a plurality of selective couplers, wherein the plurality of selective couplers includes:
a first selective coupler which, when engaged, fixedly couples the second gearset component of the first planetary gearset and the first gearset component of the third planetary gearset to the at least one stationary member;

a second selective coupler which, when engaged, fixedly couples the first gearset component of the first planetary gearset to the at least one stationary member;

a third selective coupler which, when engaged, fixedly couples the third gearset component of the first planetary gearset to the third gearset component of the second planetary gearset, the second gearset component of the third planetary gearset, and the second gearset component of the fourth planetary gearset;

a fourth selective coupler which, when engaged, fixedly couples the second gearset component of the first planetary gearset and the first gearset component of the third planetary gearset to the first gearset component of the fourth planetary gearset;

a fifth selective coupler which, when engaged, fixedly couples the first gearset component of the second planetary gearset to the first gearset component of the first planetary gearset; and a sixth selective coupler which, when engaged, fixedly couples the third gearset component of the third planetary gearset to the first gearset component of the fourth planetary gearset.

2. The transmission of claim 1, wherein the input member is fixedly coupled to the third gearset component of the first planetary gearset.

3. The transmission of claim 1, wherein each of the first planetary gearset, the second planetary gearset, the third planetary gearset, and the fourth planetary gearset is a simple planetary gearset.

4. The transmission of claim 3, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

5. The transmission of claim 4, wherein the at least one stationary member includes a housing, the housing having a first end and a second end, wherein the input member is accessible proximate the first end of the housing;

the output member is accessible proximate the second end of the housing;

the first planetary gearset is positioned between the first end of the housing and the second planetary gearset;

the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the second end of the housing.

* * * * *